United States Patent
Segev et al.

(10) Patent No.: US 10,798,118 B1
(45) Date of Patent: *Oct. 6, 2020

(54) SYSTEM AND METHOD FOR ANOMALY DETECTION IN DYNAMICALLY EVOLVING DATA USING HYBRID DECOMPOSITION

(71) Applicant: ThetaRay Ltd, Hod HaSharon (IL)

(72) Inventors: David Segev, Lapid (IL); Gil Shabat, Hod Hasharon (IL)

(73) Assignee: ThetaRay Ltd., Hod HaSharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,981

(22) Filed: Jun. 21, 2019

Related U.S. Application Data

(63) Continuation of application No. 16/199,194, filed on Nov. 25, 2018, now Pat. No. 10,419,470, which is a continuation of application No. 15/183,102, filed on Jun. 15, 2016, now Pat. No. 10,148,680.

(60) Provisional application No. 62/175,469, filed on Jun. 15, 2015.

(51) Int. Cl.
*G06F 21/00* (2013.01)
*H04L 29/06* (2006.01)

(52) U.S. Cl.
CPC ........ *H04L 63/1425* (2013.01); *H04L 63/145* (2013.01)

(58) Field of Classification Search
None
See application file for complete search history.

(56) References Cited

U.S. PATENT DOCUMENTS

| | | | |
|---|---|---|---|
| 6,742,124 B1 * | 5/2004 | Kilpatrick | G06F 21/316 713/194 |
| 9,892,238 B2 * | 2/2018 | Lahiri | G06N 3/02 |
| 2007/0136115 A1 * | 6/2007 | Senturk Doganaksoy | G06Q 40/00 705/35 |
| 2010/0274539 A1 * | 10/2010 | Virkar | G06N 20/00 703/2 |
| 2012/0263382 A1 * | 10/2012 | Robinson | G06K 9/0063 382/191 |
| 2012/0284791 A1 * | 11/2012 | Miller | G06N 7/005 726/22 |

(Continued)

OTHER PUBLICATIONS

R.R. Coifman, S. Lafon, Diffusion Maps, Applied and Computational Harmonic Analysis, 21(1), pp. 5-30, 2006.

(Continued)

*Primary Examiner* — Shin-Hon (Eric) Chen
(74) *Attorney, Agent, or Firm* — Nathan & Associates; Menachem Nathan

(57) ABSTRACT

A computer program product for performing anomaly detection, a detected anomaly being indicative of an undesirable event, the computer program product comprising: a non-transitory tangible storage medium readable by a processing circuit and storing instructions for execution by the processing circuit for performing a method comprising: receiving data comprising a plurality m of multidimensional datapoints (MDDPs), each data point having n features; constructing a dictionary D based on the received data; embedding dictionary D into a lower dimension embedded space; and classifying, based in the lower dimension embedded space, an MDDP as an anomaly or as normal.

10 Claims, 8 Drawing Sheets

(56) References Cited

U.S. PATENT DOCUMENTS

| | | | | |
|---|---|---|---|---|
| 2013/0151543 A1* | 6/2013 | Fan | ................ | G11B 27/32 707/758 |
| 2013/0173218 A1* | 7/2013 | Maeda | ................ | G05B 23/0221 702/182 |
| 2014/0222997 A1* | 8/2014 | Mermoud | ................ | H04L 41/147 709/224 |
| 2014/0379301 A1* | 12/2014 | Shastri | ................ | G05B 23/0224 702/183 |
| 2015/0205691 A1* | 7/2015 | Seto | ................ | G06F 11/008 702/182 |
| 2016/0092787 A1* | 3/2016 | Gadde | ................ | G06N 5/02 706/12 |
| 2016/0156652 A1* | 6/2016 | Paffenroth | ................ | H04L 63/1425 726/23 |

OTHER PUBLICATIONS

W. B. Johnson and J. Lindenstrauss, "Extensions of Lipshitz mapping into Hilbert space", vol. 26 of Contemporary Mathematics, Amer. Math. Soc., pp. 189-206. 1984.

W. H. Press, S. A. Teukolsky, W T. Vetterling, B. P. Flannery, Numerical Recipes in C: The Art of Scientific Computing, Second Edition, Cambridge University Press, pp. 791-794. 1992.

A. Bermanis, A. Averbuch, R. Coifman, Multiscale data samplinng and function extension, Applied and Computtaional Harmonic Analysis, 34, pp. 15-29. 2013.

R. Coifman, S. Lafon, Geometric Harmonics: A novel tool for multiscale out-of-sample extension of empirical functions, Applied and Computational Harmonic Analysis, 21(1):pp. 31-52, 2006.

Dempster, A., Laird, N., Rubin, D.: Maximum Likelihood from Incomplete Data via the EM Algorithm. Journal of the Royal Statistical Society 39(1) pp. 1-38. 1977.

Gil Shabat, Yaniv Shmueli, Yariv Aizenbud, Amir Averbuch; "Randomized LU Decomposition" Preprint submitted to Applied and Computational Harmonic Analysis, pp. 1-39. 2015.

G. H. Golub, C. F. Van Loan, "Matrix Computations", 4th Edition, John Hopkins (p. 130).2012.

* cited by examiner

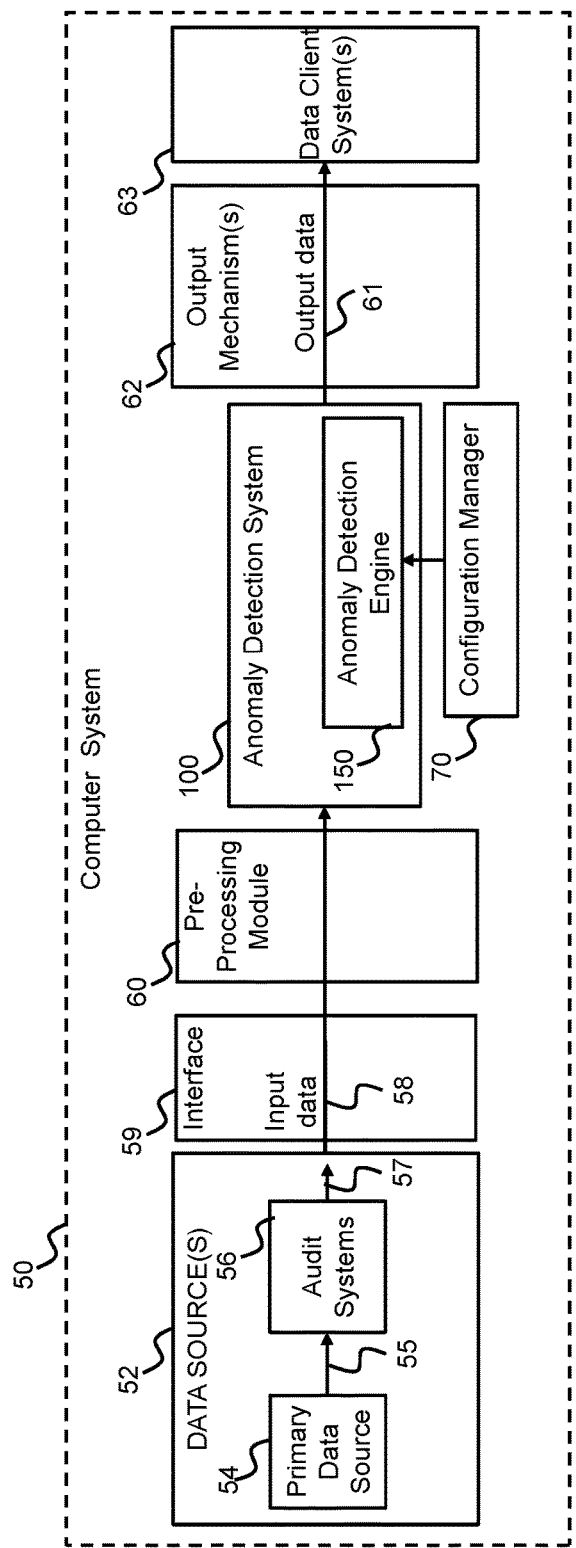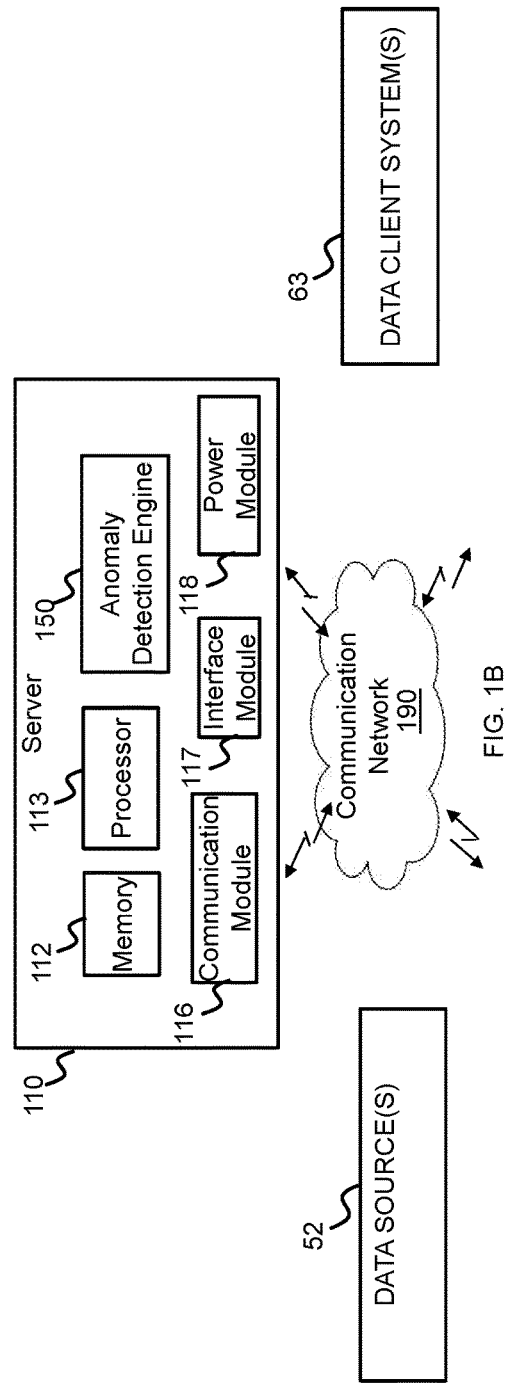

SYSTEM AND METHOD FOR ANOMALY DETECTION IN DYNAMICALLY EVOLVING DATA USING HYBRID DECOMPOSITION

CROSS REFERENCE TO RELATED APPLICATIONS

This application is a continuation of U.S. patent application Ser. No. 16/199,194 filed Nov. 25, 2018 (now allowed), which was a continuation of U.S. patent application Ser. No. 15/183,102 filed Jun. 15, 2016 (issued as U.S. Pat. No. 10,148,680) and claims the benefit of U.S. provisional patent application 62/175,469, titled "SYSTEM AND METHOD FOR ANOMALY DETECTION IN DYNAMICALLY EVOLVING DATA USING HYBRID DECOMPOSITION" filed Jun. 15, 2015 and which is incorporated herein by reference in its entirety.

FIELD

Embodiments disclosed herein relate in general to methods and systems for detecting unknown multidimensional data points (MDDPs) that are classified as anomalies (abnormalities) that deviate from normal behavior in high dimensional big data (HDBD) and which are indicative of an undesirable event, and more particularly to offline and online anomaly detection of anomalies in such data.

BACKGROUND

Huge amounts of data are generated by many sources. "Data" refers to a collection of organized information, the result of experience, observation, measurement, streaming, computing, sensing or experiment, other information within a computer system, or a set of premises that may consist of numbers, characters, images, or as measurements of observations.

Static and dynamic "high dimensional big data" (HDBD) are common in a variety of fields. Exemplarily, such fields include finance, energy, transportation, communication networking (i.e. protocols such as TCP/IP, UDP, HTTP, HTTPS, ICMP, SMTP, DNS, FTPS, SCADA, wireless and Wi-Fi) and streaming, process control and predictive analytics, social networking, imaging, e-mails, governmental databases, industrial data, healthcare and aviation. HDBD is a collection of multi-dimensional data points (MDDPs). A MDDP, also referred to as "sample", "sampled data", "point", "vector of observations" or "vector of measurements", is one unit of data from the original (source, raw) HDBD. A MDDP may be expressed as a combination of numeric, Boolean, integer, floating, binary or real characters. HDBD datasets (or databases) include MDDPs that may be either static or may accumulate constantly (dynamic). MDDPs may include (or may be described by) hundreds or thousands of parameters (or "features").

The terms "parameter" or "feature" refer to an individual measurable property of phenomena being observed. A feature may also be "computed", i.e. be an aggregation of different features to derive an average, a median, a standard deviation, etc. "Feature" is also normally used to denote a piece of information relevant for solving a computational task related to a certain application. More specifically, "features" may refer to specific structures ranging from simple structures to more complex structures such as objects. The feature concept is very general and the choice of features in a particular application may be highly dependent on the specific problem at hand. Features can be described in numerical (3.14), Boolean (yes, no), ordinal (never, sometimes, always), or categorical (A, B, O) manner.

HDBD, with all its measured or streamed features and available sources of information (e.g. databases), may be classified as heterogeneous HDBD or simply as "heterogeneous data". The terms "heterogeneous" means that the data includes MDDPs assembled from numbers and characters having different meanings, different scales and possibly different origins or sources. Heterogeneous data may change constantly with time, in which case it is referred to as "heterogeneous dynamic" data.

In known art, HDBD is incomprehensible to understand, to draw conclusions from, or to find in it anomalies that deviate from a "normal" behavior. In this description, the terms "anomaly", "abnormality", "malfunction", "operational malfunction", "outlier", "deviation", "peculiarity" and "intrusion" may be used interchangeably. "Anomaly detection" refers to a process that identifies in a given dataset patterns that do not conform to established or expected normal behavior. The detected anomaly patterns often translate into critical and actionable information in many different application domains, such as cyber protection, operational malfunctions, performance monitoring, financial transactions, industrial data, healthcare, aviation, monitoring or process control. It is therefore clear that anomaly detection has huge practical commercial, security and safety implications, to name a few.

Known machine-learning-based anomaly detection methods include usually two sequential steps: training and detection. Training phases identify the normal behavior in training data, defines a distance (affinity or metric) and provides some normal characteristic (profile) of the training data. "Training data" is data of a finite size, used as a source for learning the behavior and the properties of the data. The affinity may be used to compute deviation of a newly arrived MDDP ("NAMDDP") from the normal data profile. The detection step computes the affinities for the NAMDDP and classifies the NAMDDP as either normal or abnormal.

Anomaly detection in HDBD is critical and in extensive use in a wide variety of areas. For example, anomaly detection is used to identify malicious activities and operational malfunction in network intrusions or financial fraud, customer behavioral change and manufacturing flaws in energy facilities. In financial activities, anomaly detection is used to detect fraud, money laundering and risk management in financial transactions, and to identify abnormal user activities. Anomaly detection in these areas may also be used to detect suspicious terrorist activities.

Another area is customer behavioral analysis and measurement, practiced for example in marketing, social media and e-commerce. In these areas, attempts are made to predict behavior intention based on past customer attitude and social norms. These predictions, in turn, will drive eventually targeted advertisements and online sales. Anomaly detection in this field would relate to monitoring of changes in consumers behavior, which may avoid substantial market losses.

Yet another area involves critical infrastructure systems or process control. In this area, many sensors collect or sense continuously several measurements in a predetermined time unit. When these sensors are connected through a communication network, the area is related to "Industrial Internet" and "Internet of Things". Fusion of these measurements leads to the construction of a HDBD dataset. Here, anomaly detection may be used exemplarily for fault detection in critical infrastructure or for inspection and monitoring, and enables to perform predictive analytics. While monitoring critical infrastructure resources, anomalies originated from cyber threats, operational malfunction or both can be detected simultaneously.

In an illustrative example of anomaly detection use, an entity such as a network, device, appliance, service, system, subsystem, apparatus, equipment, resource, behavioral profile, inspection machine, performance or the like is monitored. Assume further that major activities in incoming streamed HDBD obtained through the monitoring are recorded, i.e. a long series of numbers and/or characters are recorded and associated with time stamps respective of a time of recordation. The numbers or characters represent different features that characterize activities in or of the entity. Often, such HDBD has to be analyzed to find specific trends (abnormalities) that deviate from "normal" behavior. An intrusion detection system ("IDS") also referred to as anomaly detection system or "ADS", is a typical example of a system that performs such analysis. Malfunction is another typical example of an abnormality in a system.

Similar problems in identifying abnormalities in data are encountered in many network unrelated applications. One example relates to the control or monitoring of a process that requires detection of any unusual occurrences in real-time. Another example is the real-time (online) detection of operational malfunctions in SCADA protocols. Analysis of SCADA protocols can discover either malware insertion or operational malfunction or both.

To achieve online anomaly detection, some systems may use signatures and rules of intrusions, which are developed and assembled manually after a new anomaly is exposed and distributed. This approach may be problematic, because these systems detect only already-known intrusions ("yesterday's" attacks and anomalous malfunctions) but fail to detect new attacks ("zero-day" attacks). In addition, they do not cover a wide range of high quality, new, sophisticated emerging attacks that exploit many network vulnerabilities.

Many of the current methods used to extract useful intelligence from HDBD require extensive computational resources, are time consuming, and, when used for anomaly detection, fail to detect anomalies before they become operational. Therefore, there is a need for, and it would be advantageous to have anomaly detection methods and systems that require less computational effort and are faster. There is also a need for anomaly detection methods and systems that can detect unknown anomalies representing unknown attacks or malfunctions. In other words, there is a need for methods and systems that perform automatic or "un-supervised" anomaly detection, defined as detection that does not require rules, signatures, patterns, domain expertise or semantics understanding of the input data. In addition, the number of false alarms should be as low as possible.

This summary provides a selection of concepts in a simplified form that are further described below in the Detailed Description. This summary is not intended to identify key features or essential features of the claimed subject matter, nor is it intended to be used to limit the scope of the claimed subject matter.

SUMMARY

In this description, an "undesirable event" indicated by an anomaly or by an "abnormal MDDP" or "abnormal NAMDDP" may for example be any of (but not limited to): a cyber-threat, a cyber-attack, malware presence, an operational malfunction, an operational breakdown, a process malfunction, a process breakdown, a financial risk event, a financial threat event, a financial fraud event or a financial network intrusion event.

In exemplary embodiments, there is/are provided a method or methods for detection of anomalies in HDBD indicative of undesirable events that are unknown before the application of the method or methods (referred to as "unknown" undesirable events) and systems for implementing such methods.

Embodiments disclosed herein provide a framework (methods and system) for finding anomalies captured by sensing/measuring/assembled logs, from streamed data and/or from a database. Raw data for example can also be aggregated and more computational features can be added. These features are derived by various computations on the raw data. Therefore, the input data can be either raw data or aggregated data or data that was enriched by adding computational features or combination of any of the above.

The anomaly detection system may include an anomaly detection engine which is configured and operative to implement the processes, procedures, methods and/or operations for detecting an anomaly. The anomaly detection engine may comprise a plurality of software and/or hardware-based modules, as outlined herein below in more detail. For instance, a memory of an anomaly detection system may include instructions which, when executed e.g. by a processor and/or controller, may cause the execution of an anomaly detection method, process and/or operation. Merely to simplify the discussion that follows, methods and processes disclosed herein may herein be discussed in conjunction with an anomaly detection engine. One or more hardware, software and/or hybrid hardware/software modules may realize such an anomaly detection engine.

For example, the term "engine" may comprise one or more computer modules, wherein a module may be a self-contained hardware and/or software component that interfaces with a larger system. A module may comprise machine executable instructions. A module may be embodied by a processing circuit or by a controller programmed to cause the system to implement the method, process and/or operation as disclosed herein. For example, a module may be implemented as a hardware circuit comprising, e.g., custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

In an exemplary embodiment, there is disclosed as method for detecting an undesirable event, comprising the steps of receiving a dataset comprising a plurality m of MDDPs, each data point having n features; constructing a dictionary D based on the received data; and constructing, based on the dictionary D, an embedded space; and classifying, based on the embedded space, an arrived MDDP as an anomaly or as normal.

Further, a method described herein is based on (e.g., employs) randomized LU decomposition applied to a plurality m of received MDDPs described in G. Shabat, Y. Shmueli, Y. Aizenbud and A. Averbuch, "Randomized LU decomposition", arXiv:130.7202 v4, 2016. The term "LU decomposition" means lower and upper factorization of a matrix as the product of a lower triangular matrix and an upper triangular matrix. The randomized LU decomposition is applied to a m×n matrix A of data, where each row in A contains n extracted parameters (features) and m measurements. The measurements are sampled (e.g., recorded, measured, streamed), for example, by a pre-processing module, along with their associated features in every predetermined time interval, receiving a number k as an input.

While certain steps methods are outlined herein as being executed by a specific module and other steps by another module, this should by no means be construed limiting. For instance, in an embodiment, a detection module of the detection engine may execute one or more of the pre-processing steps outlined herein.

The pre-processing module may return the following four matrices: orthogonal permutation matrices P and Q of size m×m and n×n, respectively, a lower triangular matrix L of size m×k and an upper triangular matrix U of size k×n. Ideally, k<n. k is the intrinsic dimension (rank) of the matrix A. k can be computed automatically or given. If computed, k is computed once or when the data is changed. Each row in A contains n parameters (one MDDP) extracted in each time unit.

The product PAQ forms a low rank approximation to LU. More specifically:

$$\|PAQ-LU\|_2 \leq O(\sigma_{k+1}), \quad (1)$$

where $\sigma_{k+1}$ is the (k+1)th singular value of A. Moreover, the error of projecting and reconstructing matrix A by the matrix $D:=P^T L$ is bounded. More specifically $$\|DD^\dagger A-A\| \leq O(\sigma_{k+1}), \quad (2)$$

where $D^\dagger$ is the pseudo inverse of D. The matrix D is herein referred to as a "dictionary". The construction of dictionary D is done automatically and/or in an unsupervised way without relying, for example on signatures, rules and/or domain expertise. The particular MDDP classified as abnormal is indicative of an unknown undesirable event.

In an exemplary embodiment, a computer system for detecting an unknown undesirable event disclosed herein comprises an input device configured to receive a dataset comprising a plurality m of MDDPs, a processor configured to execute instructions stored in a memory to apply pre-processing on the received plurality of MDDPs which can include, for example, the randomized LU decomposition to the plurality of MDDPs by the application of a randomized LU module and a LU decomposition module to produce 4 matrices, and dictionary construction, denoted hereinafter as "DC", for constructing a dictionary from the matrices obtained by the application of a DC construction module. Steps relating to DC construction may herein also be referred to as "first training phase". Since the LU decomposition is randomized, it is called several times (iterations) till the eigenvalues of the dictionary D decline and there are no changes in their values in comparison to a previous iteration. Another way to stop the iterations is to decide ahead of time on a predetermined number of iterations. 10 iterations are, for example, commonly used. In each iteration, a new dictionary is constructed. All the dictionaries constructed during the iterations are concatenated into a single dictionary. The dictionary construction (DC) module may be considered part of pre-processing. The output of the dictionary construction module may be used for generating an embedded space. The steps relating to generating an embedded space may herein be also referred to as "second training phase".

In an embodiment, the embedded space, optionally in conjunction with a threshold T, can be used for classifying either the given MDDP in the dataset or a newly arrived MDDP (NAMDDP) which is not part of the dataset, as normal or abnormal, wherein the classification is automatic and unsupervised without relying on a signature, rules or domain expertise. The given MDDP is classified as abnormal is indicative of the unknown undesirable event.

Exemplarily, the HDBD may be processed using a matrix A representing MDDP as a training dataset of size m×n, where m is the number of data points (rows of the matrix) and n denotes the dimensions respective of the data point features of the training data. Exemplarily, n≥2. The training data can contain anomalies.

Features may include:

1. In communication networking data: features from TCP protocol: Number of TCP/IP packets; number of UDP/IP packets; number of ICMP packets; number of packets which are not TCP, UDP or ICMP; number of TCP packets with TCP flag "syn" ON; number of TCP packets with TCP flag "ack" ON; number of TCP packets with TCP flag "cwr" ON; number of TCP packets with TCP flag "ecn" ON; number of TCP packets with TCP flag "fin" ON; number of TCP packets with TCP flag "ns" ON; number of TCP packets with TCP flag "push" ON; number of TCP packets with TCP flag "res" ON; number of TCP packets with TCP flag "reset" ON; number of TCP packets with TCP flag "urg" ON; number of TCP packets with destination port 80 (HTTP); number of UDP packets with destination port 53 (DNS); number of TCP packets with source port 0; number of data TCP packets which where retransmitted (indication of slow application performance and packet loss); number of control TCP packets (packets without a payload); number of data TCP packets (packets with a payload); number of data TCP bytes (the bytes count of all the payloads); number of TCP connections (sessions); number of completed TCP connections; ratio between the number of TCP packets with reset flag ON and the number of TCP packets with syn flag ON (computed feature); ratio between the number of TCP packets with syn-ack flags and/or the number of TCP packets with syn flag (computed feature).

2. In process control data: features from a laser machine: Base Plate Temp; BBO temp; Current Crystal; Error Signal Gain; Error Signal Max; Error Signal Min; Error Signal Offset; Etalon Temp; Laser Diode Dry. Curr.; Hor. Pos.. 2nd Quadr. Ph.-D.; LBO Temp; PD1; PD2; Power Alarm Threshold; and/or Power From Diode 1.

3. In financial data: transaction logs; account balance snapshots; customer profiles; applicant information such as income, age, account balance; collateral information such as postal code, property value, property type; application information such as loan type and/or interest, conditions. In general, each feature can be a measurement (e.g. balance, amount etc.), an identifier (e.g. account number, user id etc.) or a code (status/error code etc.). Fraudulent features may include: scheme, journal entry, journal description, manual insertion, posted date, effective date, period, debit, credit, row ID, account and/or account description.

In some embodiments, the method may include, for example, applying randomized LU ("LU" standing for "lower and upper triangular matrix") decomposition ("Function 2A", see below) to a training data of m MDDPs to obtain 4 matrices. The application of randomized LU decomposition may exemplarily include applying random projection of the training matrix A followed by the application of LU decomposition ("Function 1", see below). The output from the application of Function 2A is used by a Function 3, see below, to produce the dictionary D.

An exemplary of deterministic LU decomposition method (i.e. obtaining lower and upper triangular matrix decomposition) is outlined in G. H. Golub, C. F. Van Loan, "Matrix Computations", 4th Edition, John Hopkins, 2012 (Page 130). This method is referred to henceforth as "LU decomposition" or "Function 1".

Function 1: LU Decomposition with Partial Pivoting

A LU decomposition module computes the factorization $PA=LU$ where P is an orthogonal permutation matrix encoded by piv(1:n−1), L is a lower triangular matrix with $|l_{ij}|\leq 1$, and U is an upper triangular matrix. For i=1, ..., n, A(i,i: n) is overwritten by U(i,i: n) and A(i+1:n,i) is overwritten by L(i+1:n,i). The permutation matrix P, i.e. the matrix that performs permutation, is given by $P=\Pi_{n-1}\ldots\Pi_1$ where $\Pi_k$ is an interchange permutation obtained by swapping rows k and piv(k) of $I_n$.

Input: Matrix A of size m×n to decompose;
Output: Matrices P, L, U such that PA=LU An example pseudo-code implementation of LU decomposition (Function 1) is disclosed herein below:
1) Initialize L to identity and U to a zero matrix
2) for j=1 to n
 a. if j=1
  i. v=A(:, 1)
 b. else
  i. $\tilde{a}=\Pi_{j-1}\ldots\Pi_1 A(:,j)$
  ii. Solve $L(1:j-1,1:j-1)z=\tilde{a}(1:j-1)$ for $z\in R^{j-1}$
  iii. U(1:j−1,j)=z, $v(j:n)=\tilde{a}(j:n)-L(j:n, 1:j-1)z$
 c. end
 d. Determine µ with j≤µ≤n so $|v(\mu)|=\|v(j:n)\|_\infty$ and set piv(j)=µ
 e. v(j)↔v(µ), L(j,1:j−1)↔L(µ, 1:j−1), U(j,j)=v(j)
 f. If v(j)≠0
  i. L(j+1: n,j)=v(j+1: n)/v(j)
 g. end
3) end A randomized LU module applies random projections described exemplarily as in W. B. Johnson and J. Lindenstrauss, "Extensions of Lipshitz mapping into Hilbert space", Volume 26 of Contemporary Mathematics, pp. 189-206, Amer. Math. Soc., 1984, called hereinafter "RP".

Function 2A reduces the number of measurements in matrix A of size m×n resulting in a reduced-measurements (RM) matrix A' of size m'×n where m'<m.

The output from the application of the randomized LU module is then used by the DC module to produce dictionary D. The dictionary is an input to a module or engine that reduces the dimensionality of the dictionary and produces threshold.

An anomaly detection method and associated system disclosed herein may be characterized by not having or using domain expertise, signatures, rules, patterns or semantics understanding of all the available features. It is automatic and unsupervised. Throughout the rest of this disclosure, "online" is used among other things to mean a process that can efficiently process the arrival of new samples, e.g., substantially in real-time.

In both offline and online processing, anomalies are detected first in a training dataset having training data. In offline processing, newly arrived MDDPs can be added to the training data and the anomaly detection process is applied from start to the new enhanced training data (which includes now the added newly arrived MDDPs). In online processing, embodiments disclosed herein have access only to the training data. The rest of the data (commonly referred to as "testing data") is sensed/streamed/captured constantly in real-time, and classification of each newly arrived MDDP (NAMDDP) as being either normal or abnormal is done online. In offline processing, it is assumed that the training data and the testing data are the same.

The detection procedure classifies each NAMDDP not from the source HDBD as either normal or abnormal. The classification is for example done by the application of an out-of-sample extension function, which provides coordinates for each NAMDDP in the reduced dimension (embedded) space. The decision whether the NAMDDP is "normal" is determined by either finding whether the NAMDDP is located inside a normal cluster or by using a threshold that classifies the NAMDDP.

In an embodiment there is provided a computer program product for performing anomaly detection, a detected anomaly being indicative of an undesirable event, the computer program product comprising: a non-transitory tangible storage medium readable by a processing circuit and storing instructions for execution by the processing circuit for performing a method comprising receiving data comprising a plurality m of multidimensional data points (MDDPs), each data point having n features, constructing a dictionary D based on the received data, wherein D is embedded in a lower dimension space by dimensionality reduction and, optionally, a threshold is computed. Classifying a NAMDDP as an anomaly or as normal can be based on either an analysis of the geometry of the lower dimension space and, optionally, based on the threshold.

In an embodiment, the method comprises the step of applying randomized LU decomposition to a m×n matrix A of the data to obtain an output, wherein the step of constructing a dictionary D is based on the received data. In an embodiment, the output includes orthogonal permutation matrices P and Q of size m×m and n×n, respectively, a lower triangular matrix L of size m×k and an upper triangular matrix U of size k×n. "k" refers to the rank of matrix A.

In an embodiment, any of the embodiments of methods disclosed herein may be performed offline or online.

For instance, a step of classifying MDDP and/or NAMDDP can be performed automatically and/or unsupervised without relying on a signature and/or a rule and/or on domain expertise.

In an embodiment, an embedded space can be identified and a threshold can be determined to classify the NAMDDP as normal or abnormal.

In an embodiment, the non-transitory tangible storage medium can be cloud-based, hardware-server based and/or virtual-server based. In an embodiment, parameter settings used by the instructions are dynamically, automatically and on-the-fly configurable while the instructions are executed by the processing circuit. In an embodiment, the receiving data comprises running of integrity tests, detecting significant features, selecting the significant features and enhancing the significant features of the dataset for obtaining data for analysis. In an embodiment, the data is received from a plurality of data sources. In an embodiment, the data to be classified may be received at the non-transitory tangible storage medium via a plurality of interfaces.

In an embodiment there is provided a detection system for performing anomaly detection, a detected anomaly being indicative of an undesirable event, the system comprising: a computer and an anomaly detection engine executable by the computer, the anomaly detection engine configured to perform a method comprising receiving data comprising a plurality m of multidimensional datapoints (MDDPs), each data point having n features constructing a dictionary D based on the received data, embedding D into a lower dimensional space and then classifying a NAMDDP as an anomaly or as normal based on either a threshold determined in the embedded space or by the geometry of the embedded space.

In an embodiment of the detection system, the anomaly detection engine is configured to perform a method comprising the step of applying randomized LU decomposition to a m×n matrix A of the data to obtain an output, wherein the step of constructing a dictionary D based on the received data includes constructing the dictionary D based on the obtained output. In an embodiment of the detection system, the output includes orthogonal permutation matrices P and Q of size m×m and n×n, respectively, a lower triangular matrix L of size m×k and an upper triangular matrix U of size k×n and wherein k is the rank of matrix A.

In an embodiment there is provided a method for performing anomaly detection, a detected anomaly being indicative of an undesirable event, comprising: receiving data comprising a plurality m of MDDPs, constructing a dictionary D based on the received data, and classifying a NAMDDP as an anomaly or as normal based on the dictionary D and on a threshold T determined by embedding D into a lower dimensional space.

In an embodiment there is provided a computer program product directly loadable into the internal memory of a computer, comprising software code portions for performing a method described above when the product is run on the computer.

In an embodiment there is provided a non-transitory computer readable storage medium storing a set of instructions that are executable by at least one processor of a server to cause the server to perform a method for detecting an anomaly in received MDDPs the method comprising: receiving data comprising a plurality m of MDDPs, each MDDP having n features, constructing a dictionary D based on the received data, embedding D into a lower dimension space and classifying a NAMDDP as an anomaly or as normal based on either the geometry of the embedded space or on a threshold T. In an embodiment, the method comprises the step of applying randomized LU decomposition to a m×n matrix A of the data to obtain an output, wherein the step of constructing a dictionary D based on the received data includes constructing the dictionary D based on the obtained output. In an embodiment, the output includes orthogonal permutation matrices P and Q of size m×m and n×n, respectively, a lower triangular matrix L of size m×k and an upper triangular matrix U of size k×n and wherein k is the rank of matrix A. In an embodiment, the randomized LU decomposition is parallelized.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

For simplicity and clarity of illustration, elements shown in drawings are not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 1A shows a block diagram of a computer system operative to detect an anomaly in MDDP, according to an embodiment;

FIG. 1B shows another block diagram of the computer system of FIG. 1A;

DETAILED DESCRIPTION

Figure 2A:
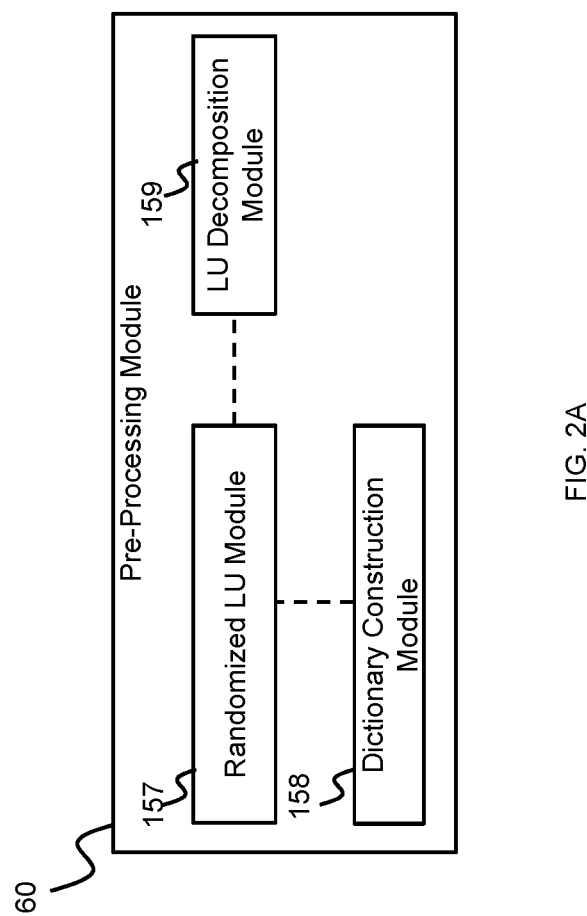
FIG. 2A shows a block diagram of the pre-processing module, according to an embodiment.

Referring to FIG. 1A, a computer system 50 may comprise an anomaly detection system 100 which may be operative to detect anomalies in computer system 50, according to embodiments disclosed herein.

Methods, processes and/or operations for detecting anomalies may be implemented by an anomaly detection engine 150 comprised in anomaly detection system 100. The term "engine" as used herein may also relate to and/or include a module and/or a computerized application.

Data input to anomaly detection engine 150 may be of versatile structure and formats, and their volume and span (the number of parameters) can be theoretically unlimited.

Computer system 50 may include a variety of data sources 52 providing inputs (e.g., feature-based data) to anomaly detection engine 150. Non-limiting examples of data sources 52 may include networks, sensors, data warehouses and/or process control equipment, which may herein be referred to as "primary data sources" 54. Data provided by primary data sources 54 may comprise, for example, historian data, financial data, sensor data, network traffic data, online data, streaming data, databases, production data and/or the like, which may herein be collectively referred to as "source data" 55. In some embodiments, source data 55 may be input to risk systems, audit system, security events managements systems and/or the like. These risk systems, audit systems, etc, may herein be collectively referred to as "audit systems" 56, providing audited data 57. Audit systems 56 may comprise platforms and/or services developed by commercial vendors collecting security events data.

Source data 55 and/or Audited data 57 may herein be collectively referred to as "input data" 58 which may be input to anomaly detection system 100. In some embodiments, input data may not include audit data 57.

In an embodiment, input data 58 may be provided to detection engine 150 via one or more interfaces 59. An interface 59 may ingest input data by employing a variety of mechanisms including, for example, (push/pull), in real time and/or in batches (historical data), over a variety of protocols and technologies. Interface 59 may for example comprise an input storage system, e.g., Hadoop Distributed File System (denoted hereinafter HDFS), SPLUNK, which is a commercial platform to perform Operational Intelligence, FILE TRANSFER, Micros service, Representational State Transfer—architectural concept of live streaming (denoted hereinafter REST API), and more.

Input data may be filtered by anomaly detection system 100, which may provide as output data 61 to one or more data client systems 63. Output data 61 may comprise filtered input data to one or more data client systems 63.

In some embodiments, output data 61 may be descriptive of analysis results, e.g., descriptive of anomaly events. In some embodiments, the output data may comprise filtered input data, i.e., input data which is free or substantially free of anomalies.

Data client systems 63 may include, for example, a multifunction mobile communication device also known as "smartphone", a personal computer, a laptop computer, a tablet computer, a server (which may relate to one or more servers or storage systems and/or services associated with a business or corporate entity, including for example, a file hosting service, cloud storage service, online file storage provider, peer-to-peer file storage or hosting service and/or a cyberlocker), customer databases, personal digital assistant, a workstation, a wearable device, a handheld computer, a notebook computer, a vehicular device, a stationary device, a controller, and/or a home appliances control system.

Output data 61 may be provided to data client systems 63 using a variety of output mechanisms 62 including, for example, using a push/pull protocol, substantially in real time or periodically (e.g., in batches) over a variety of technologies and/or protocols. Non-limiting examples of technologies and/or protocols include Arcsite, which gathers and organizes graphic data, SPLUNK, FILE TRANSFER, HDFS, REST API, Comma Separated Variables (CSV) format, JSON, which is a platform for the development of multi-agent systems, and more.

In an embodiment, computer system 50 may comprise a configuration management module 70 which is operative to controllably and dynamically configure anomaly detection system 100, e.g., to optimize its results and/or provide judgmental qualitative and quantitative measures on its operation. Configuration management module 70 may allow configuring the operation and/or workflow of detection engine 150, as well as monitoring and control thereof. Configuration management module 70 may be operative to configure the operation and/or workflow of detection engine 150 automatically. Operation of configuration manager 70 may be invoked by anomaly detection engine 150, e.g., responsive to an event (e.g., an anomaly) detected by detection engine 150. While configuration management module 70 is schematically illustrated in FIG. 1A as external to anomaly detection system 100, this should by no means be construed limiting. In some embodiments, configuration management module 70 may be part of anomaly detection system 100.

Additionally referring to FIG. 1B, an anomaly detection system 100 may include or be implemented by a server 110 running anomaly detection engine 150. Server 110 may be in operable communication with data sources 52 and data client systems 63 over a communication network 190.

While anomaly detection system 100 and engine 150 are herein illustrated as being implemented by server 110, this should by no means be construed limiting. Accordingly, anomaly detection engine 150 may be implemented by any suitable device, fully or partially. For example, some implementations and/or portions and/or processes and/or elements and/or functions of navigation engine 150 may be implemented by interface 59 and/or data client systems 63. Hence, in some embodiments, interface 59 and/or data client systems 63 for example may be considered be part of anomaly detection system 100.

Server 110 may refer, for example, to one or more servers or storage systems and/or services associated with a business or corporate entity, including for example, a file hosting service, cloud storage service, a hardware server, a virtual server, an online file storage provider, peer-to-peer file storage or hosting service and/or a cyberlocker. Server 110, which hosting the invention, may appear in various deployments models: cloud based, hardware sever, or virtual.

Server 110 may include a database 111, a memory 112 and a processor 113. Moreover, server 110 may include a communication module 116, a user interface module 117 and a power module 118 for powering the various components of server 110.

Memory 112 may include one or more types of computer-readable storage media including, for example, transactional memory and/or long-term storage memory facilities and may function as file storage, document storage, program storage, and/or as a working memory. The latter may, for example, be in the form of a static random access memory (SRAM), dynamic random access memory (DRAM), read-only memory (ROM), cache or flash memory. As long-term memory, memory 112 may, for example, include a volatile or non-volatile computer storage medium, a hard disk drive, a solid state drive, a magnetic storage medium, a flash memory and/or other storage facility. A hardware memory facility may, for example, store a fixed information set (e.g., software code) including, but not limited to, a file, program, application, source code, object code, and the like. As working memory, memory 112 may, for example, process temporally-based instructions.

Communication module 116 may, for example, include I/O device drivers (not shown) and network interface drivers (not shown) for enabling the transmission and/or reception of data over a communication network 190. A device driver may, for example, interface with a keypad or a USB port. A network interface driver may, for example, execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G including for example Mobile WIMAX or Long Term Evolution (LTE) advanced, Bluetooth®, ZigBee™, near-field communication (NFC) and/or any other current or future communication network, standard, and/or system.

The term "processor", as used herein, may additionally or alternatively refer to a controller. Processor 113 may be implemented by various types of processor devices and/or processor architectures including, for example, embedded processors, communication processors, graphics processing unit (GPU)-accelerated computing, soft-core processors and/or embedded processors.

Memory 112 may include instructions which, when executed e.g. by processor 113, may cause the execution of a method for detecting anomaly. Merely to simplify the discussion that follows, methods and processes disclosed herein may herein be discussed in conjunction with anomaly detection engine 150. One or more hardware, software, and/or hybrid hardware/software modules may realize anomaly detection engine 150.

Anomaly Detection Engine 150 may be operative to classify input data into normality or abnormality and to store, e.g., in memory 112, the analyzed input data as well as the computed dictionaries Reverting to FIG. 1A, computer system 50 may include, in some embodiments, a pre-processing module 60. In an embodiment, pre-processing module 60 may receive input data, selecting the significant features, enhancing them as outlined in more detail herein below, and preparing the data for analysis. In an embodiment, the dictionary D building is done by pre-processing module 60.

Figure 2B:
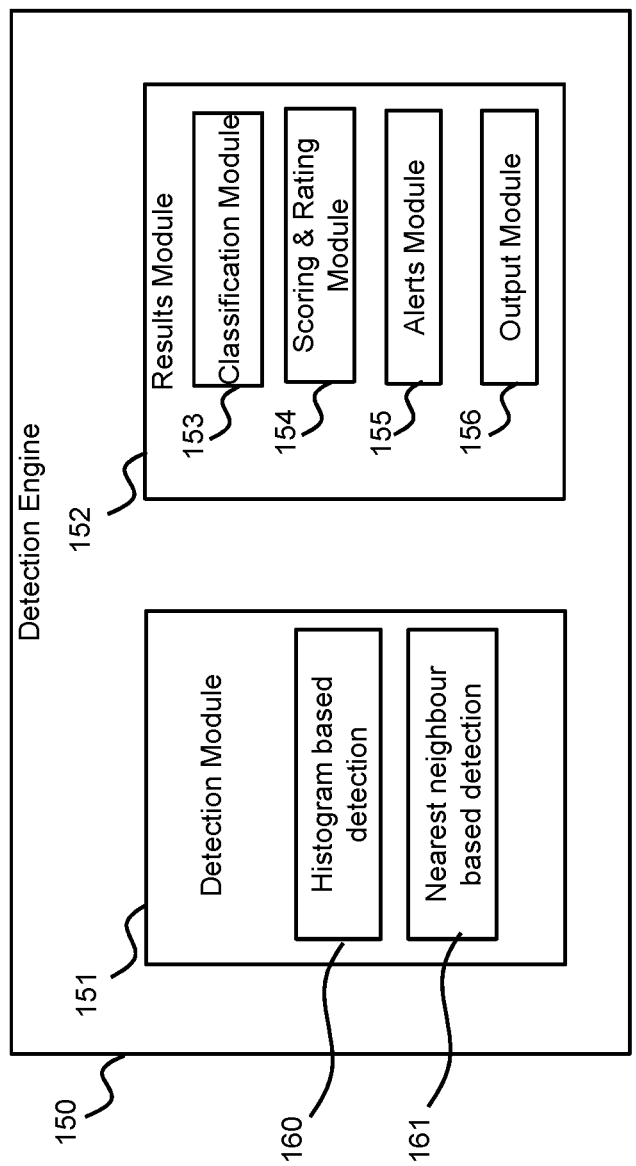
FIG. 2B shows a block diagram of a detection engine, according to an embodiment.

Further referring to FIG. 2B, based on the constructed dictionary D, an analysis of MDDPs or NAMDDPs may be performed by a detection module 151 and a results module 152 of a detection engine 150.

In an embodiment, detection module 151 may execute core functions for detecting anomalies, including the application of randomized LU to build dictionaries, outlined herein below in more detail. Detection may be histogram-based or nearest-neighbor based and be implemented, respectively, by a histogram-based detection module 160 or a nearest neighbor-based detection module 161 of detection module 151

In an embodiment, result module 152 may comprise a classification module 153, a scoring and rating module 154, an alerts module 155 and an output module 156.

Classification module 153 may classify received input data as "normal" or "abnormal" ("anomaly"), as outlined herein in more detail Parameters rating module 154 may for example provide key investigation leads for pin-pointing to the root of the detected anomaly, for example, for later investigation, e.g., by employing slice & dice similarity analysis.

Alerts module 155 may prepare alerts, which may be reported via output module 156.

Anomaly detection system 100 and/or detection engine 150 being executed by detection system 100 may be dynamically configurable, manually or automatically, "on-the-fly". The term "configuring" as used herein as well as grammatical variations thereof may include, for example, adding, changing and/or the removing of data sources; modification of data types and/or formats; modification of interfaces; modification of operational modes; feature selection; feature enhancement by computation; data sorting, data integrity validation; addition, omission and/or modification of measures computed on input data; changing data input mechanisms which may include, for example, "pull and push" over a variety of collection technologies; performing batch mode, live streaming or both; applying and/or modifying computational measures to the input data features and/or further addition, omission and modification of the measure—all done on-the-fly without changing the system software code and without even halting the system's operation.

In an embodiment, the various configurations and modifications inputs may be provided by a user via user interface 117 which may include, for example, a keyboard and/or a touch screen. In an embodiment, the mechanism of pull/push may be applied to input and to output data in the same way or differently.

Pre-processing module 60 may receive a list of input sources via a variety of interfaces, using various protocols and mechanisms. Pre-processing module 60 may process input data (e.g. in the form of a matrix A that has for example m data points and n features defined below) for determining its integrity, selects features from the input data for analysis, and, optionally, enhance the selected features, e.g., with aggregations and other methods, to obtain enhanced feature vectors. These activities may be called "Operation Maintenance Administration Provisioning" (OMAP) or "computed features".

Data relating to the OMAP may be stored in memory 112 by pre-processing module 60. Such data may include input data, processed input data, selected input data, and/or data descriptive of enhanced feature vectors.

In some embodiments, enhanced feature vectors may be input to detection module 151. In some embodiments, training data processing module 151 may be operative and configured to identify training data that will enable to detect anomalies in offline and/or online modes.

In online processing, detected anomalies are related to NAMDDPs. In some embodiments, detection engine 150 may perform domain analytics in a "data-driven" manner. In other words, operational flow and control of detection engine 150 may be "data-driven" such to achieve seamless integration of detection system 100 with any data source.

The data-driven manner of domain analytics makes system 100 applicable for data analytics in any (even futuristic, unknown, not yet defined, unpredictable) domain, such as industrial data, financial information, aviation, healthcare, telecom, transportation and/or predictive analytics.

Anomaly detection engine 150 may be configured and operative to allow data-driven instilling of input data, of any type, in any format, without any prior knowledge of its structure and logical meaning.

In an embodiment, data-driven input processing can include integrity checks, cleaning and filtering.

In an embodiment, data-driven enhancement of computational measures on input data features including algebraic operations, statistical operators (deviation), aggregations, linking with different external tables, joining between different tables/sources into a single source, filtering, join of data items, and/or sorting.

In some embodiments, anomaly detection system 100 may allow dynamic, self-balanced, and/or data-driven workflow of anomaly detection. Such work flow may for example include reading run-time configuration data from, e.g., memory 112 and/or from database and generate executable elements according to the configuration data. For example, the run-time configuration data may determine the number of executable elements of pre-processing module 60, and of computational elements of training data processing module 151, respectively. Then, due to changes in the velocity or rate of ingested input data, system 100 may dynamically and on-the-fly change its operational parameters, to create more computational elements to handle and pre-process input data. This way, the work flow, throughput and performance are optimized.

MDDPs may be scored by results module 153 from strong to weak. The MDDP parameters of the anomalies are rated for finding the root cause for the anomalies occurrences. This enables to achieve comparatively more reliable forensic, as opposed to when using, for example, domain expertise, rules, signatures and/or semantics to analyze input data.

As indicated above, the anomaly detection system provided herein may have two operational modes: offline and online detection. The operational modes are of both system and method. The offline mode (also referred to as training process) may be applied to a fixed dataset known in advance. The online mode processes newly-arrived MDDPs (NAMDDPs) that did not participate in the training process. In some embodiments, a training process may be applied to a dataset that comprises "old" NAMDDPs. "Old NAMDDP" refers to an NAMDDP that was fused with an existing MDDP (e.g., training data) stored, e.g., in memory 112 of system 100. For example, such "old" NAMDDPs may be fused with NAMDDPs to obtain new training data. In some embodiments, a step that is performed in the offline mode may be executed in the online mode. However, merely to simplify the discussion that follows, without being to be construed as limiting, the terms "offline mode" and "online mode" are used herein for indicating the processing of a fixed dataset known in advance and for the processing of NAMDDPs, respectively. NAMDDPs are processed online based on the offline-processed dataset.

Accordingly, the offline and the online modes may be used to detect anomalies in fully known data and in NAMD-DPs, respectively. The fully known data and NAMDDPs can come from different sources.

Figure 3A:
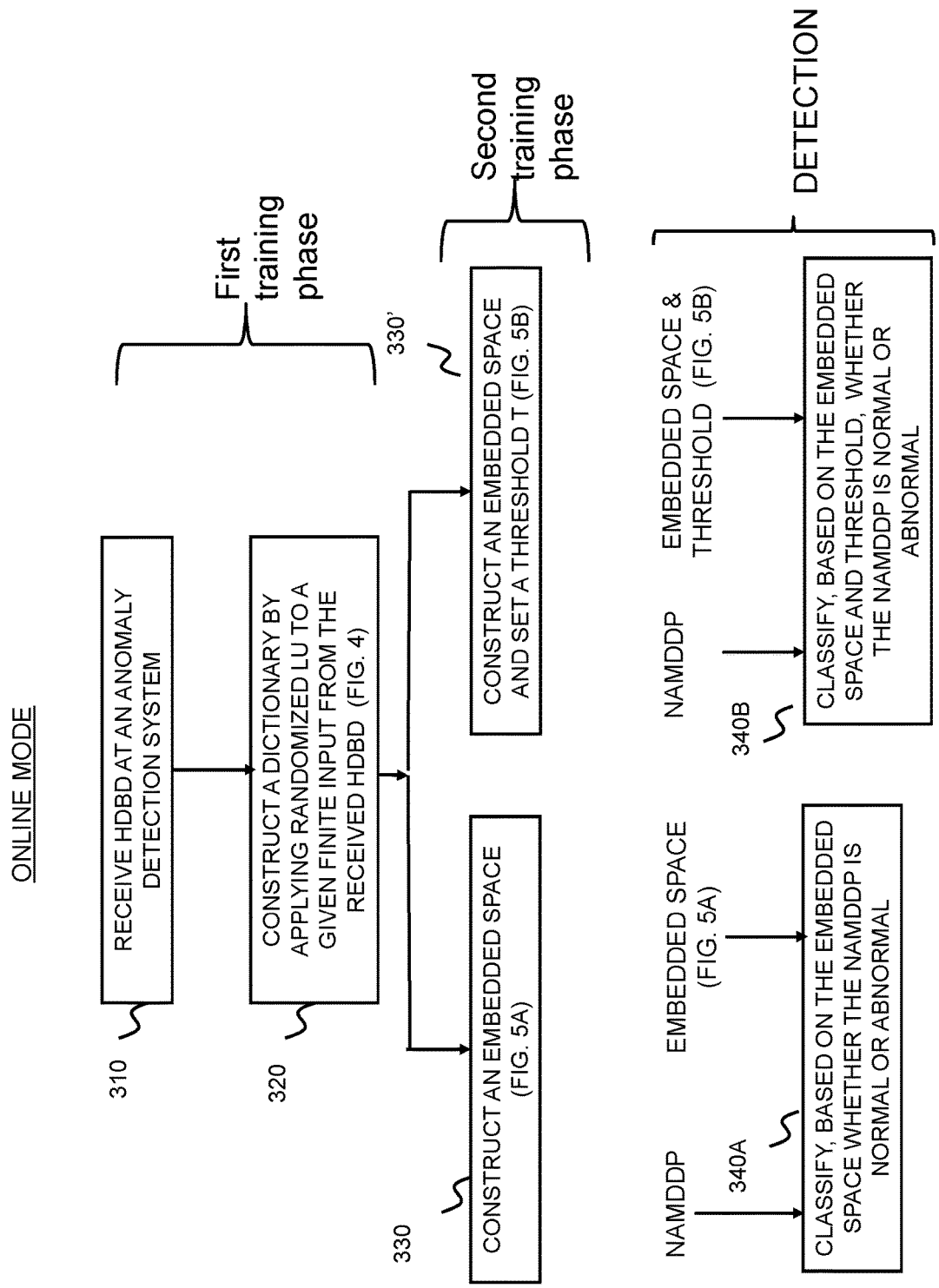
FIG. 3A shows a flow chart of an online training and detection mode according to an embodiment.
Figure 3B:
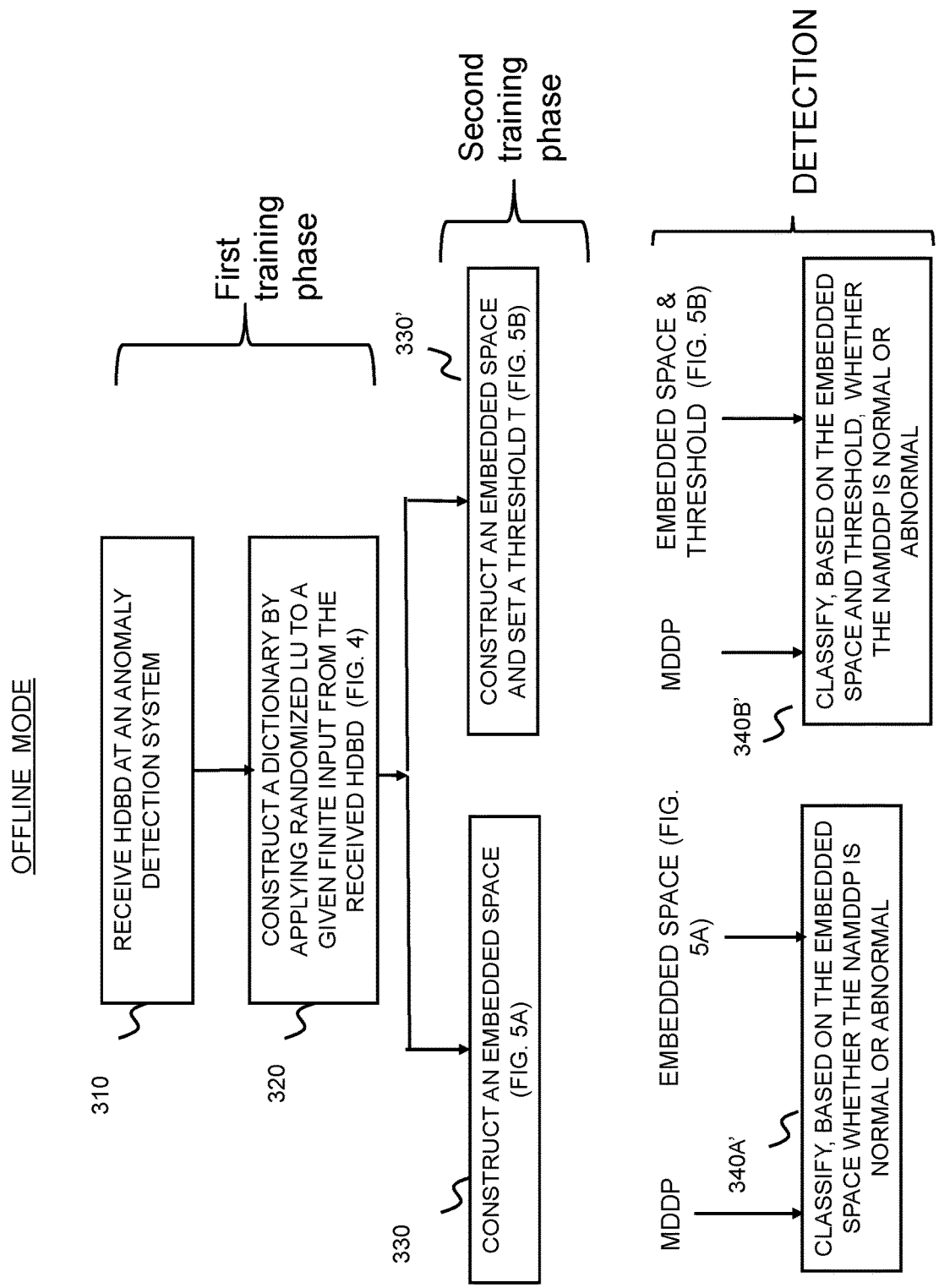
FIG. 3B shows a flow chart of an offline training and detection mode according to an embodiment.

Further reference is made to FIGS. 3A and 3B. In an embodiment, the method may include, in the online mode, receiving HDBD (step 310) at anomaly detection system 100. For example, HDBD may be received from data sources 52 as input at memory 112.

As already mentioned herein, input data may be received from a variety of data sources 52. Non-limiting examples of data sources include network traffic, logs, equipment sensors, production data, databases and/or historian. In some embodiments, input data may be organized in a matrix A. Matrix A may be a "feature-based" matrix A. In some embodiments, organizing the received data may include removal of duplicate MDDPs entries in A.

In an embodiment, matrix A can be defined as a matrix of size m×n, where the rows m represent the number of measured of MDDPs, and columns n represent the different features (or parameters) for each measured MDDP. The rows of matrix A may also be referred to as "vector of m data points". The matrix A is also called the training set.

In an embodiment, the method may further include constructing a dictionary via the application of a randomized LU to a given finite input from the HDBD (step 310). The application of randomized LU may be performed by a Randomized LU module 157, in conjunction with a LU decomposition module 159 of pre-processing module 60. A dictionary may be constructed by a dictionary constructions module 158 of pre-processing module 60 (step 320). The sequence of steps 310 and 320 may herein be referred to as a training phase.

In an embodiment, the method may include constructing an embedded space and, optionally setting or determining a threshold T (steps 330 or 330').

In an embodiment, the method may then include in a step 340 (340A, 340A', 340B or 340B'), classifying the received NAMDDP. Classification of the received NAMDDP may be performed by results module 152 of detection engine 150.

In online mode, a NAMDDP x∈$R^n$ and x∉A, which does not belong to A, is classified as either normal (inlier) or anomalous (outlier) MDDP. In offline mode (x∈A), outliers in A are classified as anomalous MDDPs.

It is noted that the offline mode of operation, the training and the testing operate are applied to the same data. Therefore, the offline mode of operation may be considered a special private case of the online mode of operation. Already-known MDDPs (x∉A) may be processed offline and referred to as training data.

Referring to FIG. 3B, the steps of an online detection classification mode may be performed as outlined herein in conjunction with FIG. 3A, with the difference that in a step 340' that follows step 330, instead of MDDPs, NAMDDPs are classified as normal or abnormal based on the embedded space and a threshold T.

Figure 4:
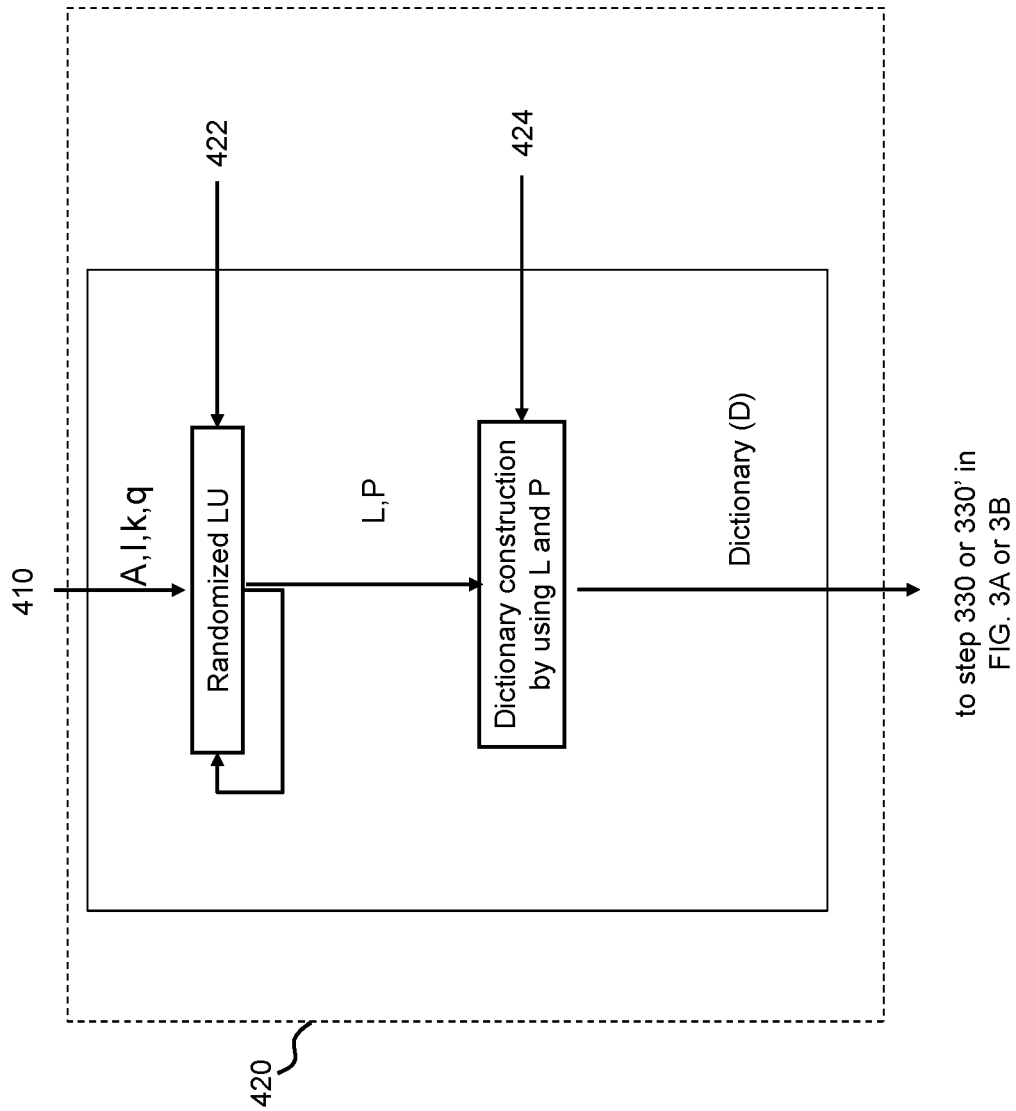
FIG. 4 shows a block diagram illustration of a of a training phase sequence that outputs a dictionary D, according to an embodiment.

Additional reference is made to FIG. 4.
The inputs (410) to the first training phase 420 are:
Matrix A of size m×n (m data points on n features) that represents the training data set, k is the rank of A, l is the number of random projections and q is the number of power iterations (can be zero).

In a training sequence relating to step 320, the following procedures may applied to matrix A in the online mode of operation.

Function "Randomized LU" is called (step 422).
The Input to function "Randomized LU": Matrix A of size m×n to decompose.

The Output of function "Randomized LU": Matrices P, L, U such that PA=LU where L and U are the lower and the upper triangular matrices, respectively, and P is an orthogonal permutation matrix given by P=$\Pi_{n-1}$ . . . $\Pi_1$ where $\Pi_k$ is an interchange permutation obtained by swapping rows k and piv(k) of $I_n$. The output of "Randomized LU" may be stored in memory 112.

More specifically, step 422 computes the factorization PA=LU, where P is a permutation matrix encoded by piv(1:n−1), L is lower triangular with $|l_{ij}| \leq 1$ and U is upper triangular. For i=1, . . . , n, A(i,i:n) is overwritten by U(i,i:n) and A(i+1:n,i) is overwritten by L(i+1:n,i). The permutation P is given by P=$\Pi_{n-1}$ . . . $\Pi_1$ where $\Pi_k$ is an interchange permutation obtained by swapping rows k and piv(k) of $I_n$.

The Following is an Exemplary Pseudo-Code Implementation of Step 422:
Function 2: Randomized LU Decomposition
Input: Matrix A of size m×n to decompose; k rank of matrix A; l number of random projections where l>k; q number of power iterations (can be zero).
Output: Matrices P,Q,L,U such that $\|PAQ-LU\|_2 \leq O(\sigma k+1)$, where P and Q are orthogonal permutation matrices, L and U are the lower and upper triangular matrices, respectively.
1) Create a matrix G of size n×l whose entries are i.i.d. Gaussian random variables with zero mean and unit variance.
2) Y←AG /* Random projection */
3) for i=1 to q do
   Y←A($A^T$Y) /* $A^T$ is the transpose of A */
4) end for
5) Apply "LU decomposition" (Function 1) to Y such that $PY_y = L_y U_y$
6) Truncate $L_y$ and $U_y$ by choosing the first k columns and rows, respectively: $L_y \leftarrow L_y(:,1\ k)$ and $U_y \leftarrow U_y(1:k,:)$
7) B←$L_y^\dagger$PA
8) Apply "LU decomposition" (Function 1) to B with column pivoting BQ=$L_b U_b$
9) L←$L_y L_b$
10) U←$U_b$ In a further step 424, the dictionary D is constructed.
The Following Outlines an Exemplary Pseudo-Code Implementation of "Dictionary Construction":
Function 3: Building a Dictionary D
Input: Matrix A of size m×n representing the training data set; k is the rank of A; l number of random projections where l>k; q number of power iterations (can be zero).
Output: Dictionary D
1) [L, U, P, Q]←RandomizedLU(A, l, k, q) ("Randomized LU"—step 422—FIG. 4)
2) D←$P^T$L (step 424—FIG. 4)
3) return D Function 3 may be applied several times (e.g., at least 3, 4, 5, 6, 7, 8, 9, 10 12 or 14, 16, 18 or times until stabilized eigenvalues are obtained.

The following is an example that explains how to apply the function shown in FIG. 4. Assuming that matrix A is of size 10000×300 (10000 measurements on 300 features) and that the rank k of A is 46. After each run of the randomized LU function, a matrix B of size 46×300 is obtained. This can be repeated 10 times (different numbers of iterations is also possible), which are saved and concatenated to get a matrix C of size 460×300. Each result after one application of the randomized LU is placed in matrix C such that each matrix B is placed below the previous matrix B.

Figure 5A:
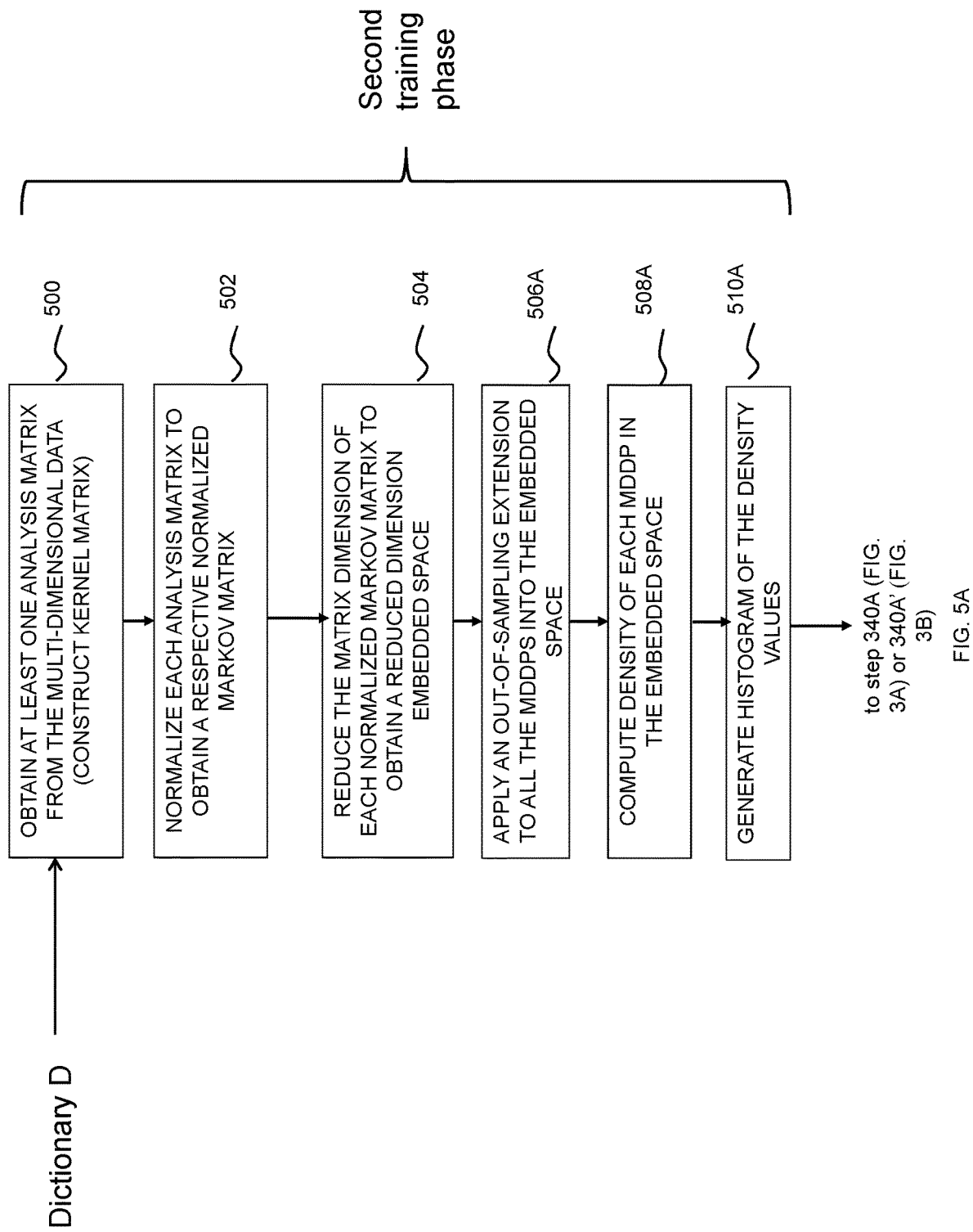
FIG. 5A shows a flow chart of a training phase followed by a detection method of one embodiment.
Figure 5B:
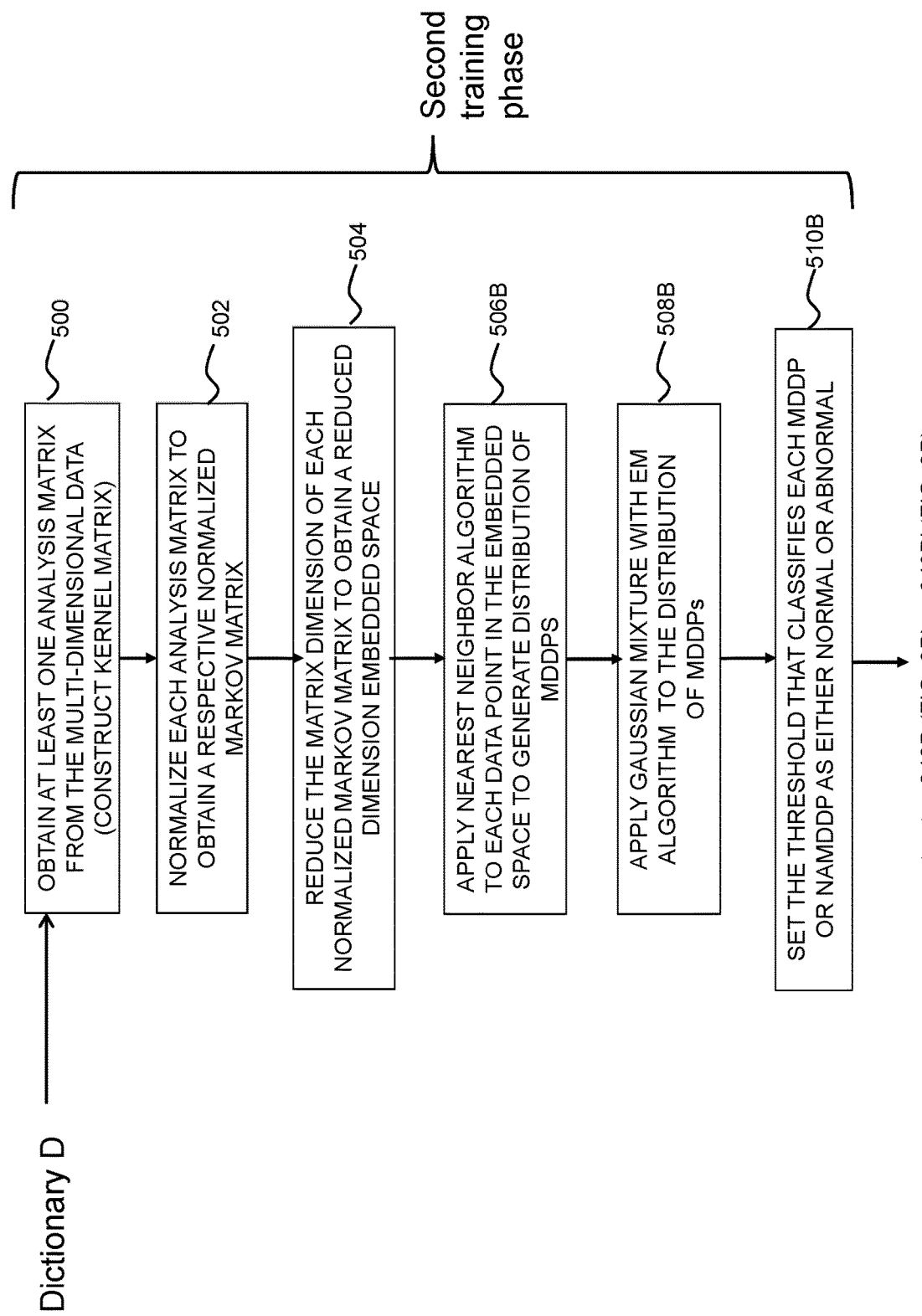
FIG. 5B shows a flow chart of a training phase which is followed by a detection method of an alternative embodiment.

Additional reference is made to FIGS. 5A and 5B.

The kernel method, which is based on diffusion geometry and described next in conjunction with steps 500-504, is applied to matrix C that was generated from the dictionary construction (FIG. 4).

The output dictionary D from the randomized LU based methodology can be the input to a framework based on diffusion processes and diffusion geometries for finding low dimensional intrinsic meaningful geometric descriptions in HDBD. Eigenfunctions of the generated underlying Markov matrices may be used to construct diffusion maps (called hereinafter "RLDM" and which are described, exemplarily, in R. R. Coifman and S. Lafon, "Diffusion maps", *Applied and Computational Harmonic Analysis,* 21(1), 5-30, 2006). Markov matrices, with or without RP generate efficient representations of complex HDBD geometric structures in a lower (reduced) dimension space (also called "embedded space") for further analysis.

An associated family of diffusion distances, obtained by iterating a Markov matrix, defines multi-scale (coarse-graining) geometries. The spectral properties of Markov processes are related to their geometric counterparts. The dimensionality of the data is reduced in a non-linear way to the reduced-dimension space where all the sought after information lies. The non-linear dimension reduction also enables classification of the data and to analyze it in the reduced—dimension space, without violating the integrity and the coherence of the original high-dimensional data. The classification allows to find anomalies that deviate from normal behavior in dynamically changing HDBD.

Classification of MDDPs as normal or abnormal may be done by the application of an out-of-sample extension function which provides coordinates (parameterization) for each NAMDDP in the embedded space. "Out-of-sample extension" (described in W. H. Press, S. A. Teukolsky, W T. Vetterling, B. P. Flannery, Numerical Recipes in C: The Art of Scientific Computing, Second Edition, Cambridge University Press, 1992, pp. 791-794, denoted hereinafter as NR and in A. Bermanis, A. Averbuch, R. Coifman, Multiscale data sampling and function extension, Applied and Computtaional Harmonic Analysis, 34, 15-29, 2013, R. Coifman, S. Lafon, Geometric Harmonics: A tool for multiscale out-of-sample extension of empirical functions, Applied and Computational Harmonic Analysis, 21(1):31-52, 2006. The above references may be herein be referred to as NYSTROM and are can be defined as an action for providing diffusion coordinates to each NAMDDP in the embedded space. Thus, the application of out-of-sample extension enables, upon arrival of each NAMDDP, to determine whether the NAMDDP lies in a cluster of normal activities or outside a cluster (deviates, abnormality). The organization of the empirical observations into simpler low-dimensional structures is enabled by spectral and harmonic analysis of the non-linear embedding and by the application of the out-of-sample extension.

According to an embodiment, a dictionary-based input may be organized as MDDPs. In some embodiments, each MDDP comprises a plurality (e.g., more than 3) of different parameters. The collection of such MDDPs, which is a dictionary, is considered to be a "surrogate to the system" and is organized as a graph in which various vectors of MDDPs are linked by their similarity. The similarity is a measure imposed by the user. A diffusion similarity metrics imposes a similarity relationship between any two MDDPs by computing all possible transition probability combinations among pairs of MDDPs. Clustering of these MDDPs in the similarity metrics can be employed for characterizing different system regimes, such that all the normal MDDPs are inside "normal" clusters and all abnormal MDDPs are outside the same clusters. Various local criteria of linkage between MDDPs may lead to distinct geometries. In these geometries, the user can redefine relevance via a similarity measure, and this way filter away unrelated information. The choice of the eigenfunctions of a normalized similarity matrix provides a global organization of the given set of MDDPs. RLDM embeds the dictionary based MDDPs into a low-dimensional space and converts isometrically the (diffusion) relational inference metrics (also called "diffusion similarity matrix") to a corresponding Euclidean distance.

Diffusion coordinates are assigned via out-of-sample extension to each NAMDDP from the original source HDBD without having to re-compute RLDM as new data streams in. The out-of-sample extension procedure enables determining the coordinates of each NAMDDP. The Euclidean distance represents the computed diffusion metrics in the low-dimensional embedding using RLDM. RLDM enables data exploration and perceptualization, since they convert complex similarity chains to an ordinary physical distance in the embedded reduced space, thus providing situational awareness of the state of the system.

Once the dictionaries are computed and a single dictionary is generated by concatenation of all the dictionaries a method may, according to some embodiments, further include two sequential procedures:

Training ("learning") Normal activities of the incoming dictionary data are studied. The training process may be called once during an operation cycle to create an embedding matrix or constantly (online training) to update the embedding matrix constantly. The embedding matrix finds the intrinsic geometry (manifold) on which original "normal" dictionaries data reside. The intrinsic geometry reflects the dimensionality reduction of the normal data. This is a non-linear transformation of a dictionary representation to an embedded lower dimension space, which also reveals the underlying features and parameters that govern the source data. The feature extraction procedure, followed by its embedding in the lower dimension space, describes faithfully the normal behavior of the dictionary data. After analysis, each training dataset (or "training set") represents a typical normal profile of the activities in the incoming of the source HDBD that did not participate in the training. The training process clusters the data into "normal" clusters. Since the training process is always done offline, it can be updated in the background all the time. Therefore, it supports steady online construction of training data to replace current training data, if the latter deviate from the current training profile.

If the training data is partially corrupted, it can still be useful to determine the normal behavior of the incoming HDBD. The training process (extraction of parameters and their embedding in lower dimension space) can overcome a situation in which a portion of the training data is corrupted. The training process also detects anomalies through the out-of-sample extension of the initial data.

This initial data may also be called a "training data". The training data is processed using a function described to provide an embedding matrix.

In step 504, the embedding matrix forms a lower dimension embedded space. In step 340, an out-of-sample extension function computes coordinates of each NAMDDP in the lower dimension embedded space. The computed coordinates of the MDDP are used to classify the normality or abnormality of the NAMDDP, which has the same structure as from which the source data a dictionary was constructed. The NAMDDP is classified as either normal or abnormal.

In a step 500, the Dictionary D is processed to provide at least one analysis matrix (e.g., Kernel matrix).

In a step 502, each analysis matrix is normalized to obtain a respective normalized Markov matrix. This can be done using normalization procedures, or using a specific normalization procedure. The normalization converts each column (feature) in a matrix to a common scale with the other features. One option is to apply RLDM to each feature column.

In a step 504, each normalized Markov matrix is reduced in dimension to obtain the embedding matrix (also: reduced dimension embedded space) by the application of RLDM. The embedding matrix has the same number of rows as the Markov matrix but has a smaller number of columns (features). The reduced number of columns of the embedding matrix are then used to obtain a reduced dimension manifold. For visualization of the geometry of this embedding, three columns of the embedding matrix are now used to obtain a reduced (at least two-dimensional—2D) dimension manifold. There is one embedding matrix per each Markov matrix. The anomaly detection (steps 506B-510B) may be performed in one of two ways:

Offline Detection Method:

The offline detection method can be applied to analyze offline raw data that was generated from dictionary concatenation after several applications of Function 3. Furthermore, the offline data analysis contains all the information needed for performing anomaly detection. Therefore, anomaly detection can be performed in a single offline stage assuming that the training and detection datasets are the same.

Online (OL) Detection Method:

OL detection can be applied to analyze real-time raw HDBD. For example, it is suitable for analysis and detection of online MDDPs which is constantly streamed through a network, and/or of data obtained from real-time measurements in process monitoring. In OL detection, the data received is analyzed and processed continuously. Here, the efficiency of the functions and their operation are critical. In contrast with offline (OF), OL can involve a single offline initial or first training phase (330 or 330' in FIG. 3B) for a pre-determined training period, followed by a second training phase and detection according to one embodiment (FIG. 5A) or another embodiment (FIG. 5B). The two training phases generate the infrastructure for the detection (the "normal clusters"). More details of each process are given next.

Classification of MDDPs as Normal or Abnormal Based on Reduced Dimension Embedded Space, without Threshold T (FIG. 5A):

Classification of MDDPs as normal or abnormal may be done by the application of an out-of-sample extension function which provides coordinates (parameterization) for each NAMDDP in the embedded space. Thus, the application of out-of-sample extension enables, upon arrival of each NAMDDP, determines whether the NAMDDP lies in a cluster of normal activities or outside a cluster (deviates, abnormality).

The organization of the empirical observations into simpler low-dimensional structures is enabled by spectral and harmonic analysis of the non-linear embedding and by the application of the out-of-sample extension.

Offline detection is applied to the dictionary D. The major Offline detection process steps are outlined, followed by a more detailed description of each phase.

Offline Detection High Level Description

The input data is a matrix of size m×n where m is the number of rows in the dictionary D and n is the number of features in each row of the input dictionary.

1. The columns entries are normalized (502) in different ways. One way to normalize each column (feature vector) of the matrix is as follows:

a. Pair-wise distances between the entries of each vector in the matrix are computed to produce a similarity matrix;

b. The similarity matrix is analyzed via the application of RLDM. The normalized output matrix from this procedure is described by a selected group of r eigenvectors of the distances matrix, where r≥2;

c. Each column vector of the normalized output matrix is set to the selected eigenvectors of the distances matrix.

2. The normalized output matrix is processed (step 504) by the application of RLDM to derive its embedding matrix as follows:

i. Pair-wise distances in the normalized output matrix are computed using, for example, any one of the following distance metrics:

1. Euclidean distance;
2. Weighted Euclidean distance;
3. Cosine distance;
4. Mahalanobis distance.

Additional or alternative distance metrics may be applied.

ii. The distances matrix is analyzed by the application of RLDM to return its eigenvectors;

iii. A selected group of r eigenvectors, where r≥2, is selected from the embedding matrix.

3. The identification of abnormal MDDPs using the embedding matrix may be performed as follows:

a. Apply out-of-sampling extension to all the MDDPs into the embedded space 506A;

b. The density (the number of MDDPs in each MDDP's neighborhood) of each MDDP in the embedded space using Euclidean distance is computed (508A);

c. A histogram of the density values is generated (510A);

d. All the MDDPs in the smallest bin are classified as abnormal, while all the other MDDPs are classified as normal (340A or 340A').

Referring to FIG. 5B, the identification of abnormal MDDP can alternatively be done by the following: As indicated by step 506B, the method may include:

a. Apply out-of-sampling extension to all the MDDPs into the embedded space;

b. The average distance from each MDDP to their neighboring MDDP is computed in the embedded space, based on Euclidian distances;

c. A histogram of the average distance is generated to generate distribution of MDDPs; As indicated by step 508B of FIG. 5B, the method may then include:

d. Applying a Gaussian mixture fit to the histogram computed in the precedent stage c; e. see for instance: Dempster, A., Laird, N., Rubin, D.: Maximum Likelihood from Incomplete Data via the EM Algorithm. Journal of the Royal Statistical Society 39(1) (1977) p 1-38.

As indicated by step 610B, the method may then include:

f. employing a posterior probability approach to determine a threshold T which splits normal average distance to nearest neighbors (the smallest values) from abnormal average distances (the largest values);

g. The method may include classifying MDDP as normal or abnormal.

For example, all the MDDPs with an average distance to the nearest neighbors, which is greater than the threshold T, may be classified as abnormal.

Detailed Description of the Offline Detection Method

Processing the dictionary D: Let H be a MDDPs of raw data. Let dictionary D be a matrix of size m×n produced from H as follows: m is the number of rows in the dictionary and n is the number of features;

Normalization matrix or dictionary D: For column l, $1 \leq l \leq n$, from the dictionary D denoted by $d^l = \{d_{il}: 1 \leq i \leq m\}$, its pair-wise Euclidean distances matrix are determined, whose entries are $\tilde{d}_{ij}^l = \{|d_{il} - d_{jl}|: i, j = 1, \ldots, m\}$. A Gaussian kernel $$K_{ij}^l = e^{-\frac{\tilde{c}_{ij}}{\varepsilon}}, i, j = 1, \ldots, m.$$

which is symmetric and non-negative is built. Further, $\varepsilon$ is determine. Then, dictionary D is normalized into a Markov transition matrix $P_{ij}^l$. $P_{ij}^l$, which is the normalized graph Laplacian and which can be constructed as follows, for example:

$$P_{ij}^l = \frac{K_{ij}^l}{\sum_{q=1}^m K_{iq}^l}, i, j = 1, \ldots, m.$$

is a Markov matrix since $$\sum_{q=1}^m P_{iq}^l = 1 \text{ and } P_{ij}^l \geq 0.$$

Since $P_{ij}^l$ is a symmetric positive semi-definite kernel, it leads to the following eigen-decomposition:

$$P_{ij}^l = \sum_{w \geq 1}^m \lambda_w^l v_w^l(d_{il}) v_w^l(d_{jl})$$

where $\lambda_w^l$ are the eigenvalues and $v_w^l$ are the eigenvectors. Finally, column l of the normalized matrix A is built by taking the second eigenvector of the eigen-decomposition of $P^l$, where $a^l = v_2^l$. The latter stage is repeated for each l, $l=1, \ldots, n$. At the end of this process, the original data in dictionary D is replaced by the normalized matrix A.

Processing normalized matrix A—derivation of embedding matrix $\Psi$: the dimensionality of the data from n (number of features) to r is reduced where usually $r \ll n$ in high-dimensional problems. This process applies the RLDM.

Embedding by RLDM: the row vector is denoted i, $1 \leq i \leq m$, in the normalized matrix A by $\vec{a} = \{a_{ik}: 1 \leq k \leq n\}$. For matrix A its pair-wise distances matrix $\tilde{A}$ whose entries are $\tilde{a}_{ij}$ using, for exemplarily one of the following distance metrics are determined:

1. Euclidean distance metric:

$$\tilde{a}_{ij} = \left\{ \sqrt{(\vec{a}_i - \vec{a}_j) \cdot (\vec{a}_i - \vec{a}_j)} : i, j = 1, \ldots, m \right\}.$$

2. Weighted Euclidean distance metric:

$$\tilde{a}_{ij} = \left\{ \sqrt{\frac{(\vec{a}_i - \vec{a}_j)}{\vec{w}} \cdot \left(\frac{(\vec{a}_i - \vec{a}_j)}{\vec{w}}\right)^T} : i, j = 1, \ldots, m \right\},$$

where $\vec{w} = \{w_k: k=1, \ldots, n\}$ is a weighting factor vector. The larger is $w_k$, the smaller is the influence of the k-th feature on the distance between $\vec{a}_i$ and $\vec{a}_j$.

3. Cosine distance metric:

$$\tilde{a}_{ij} = \left\{ \left(1 - \frac{\vec{a}_i \vec{a}_j^T}{\sqrt{\vec{a}_i^T \cdot \vec{a}_i} \sqrt{\vec{a}_j^T \cdot \vec{a}_j}}\right) i, j = 1, \ldots, m \right\}$$

4. Mahalanobis distance metric:

$$\tilde{a}_{ij} = \left\{ \sqrt{(\vec{a}_i - \vec{a}_j) \cdot \Sigma^{-1} \cdot (\vec{a}_i - \vec{a}_j)^T} : i, j = 1, \ldots, m \right\}$$

where $\Sigma$ is the sample covariance matrix. $\Sigma$ can also be the features matrix. Additional or alternative matrices can be applied.

A Gaussian kernel may then be build $$K_{ij} = e^{-\frac{\tilde{a}_{ij}}{\varepsilon}}, i, j = 1, \ldots, m.$$

Since $\varepsilon$ is fixed for all entries in $\tilde{A}$, it gives a coarse scaling control. A finer scaling control can be achieved as follows: First, the initial Gaussian kernel $\tilde{K}_{ij}$ with the fixed scale control $$\varepsilon, \tilde{K}_{ij} = e^{-\frac{\tilde{a}_{ij}}{\varepsilon}}, i, j = 1, \ldots, m$$

is built.

Then, a Gaussian kernel $$K_{ij} = e^{-\frac{\tilde{a}_{ij}}{\sum_{q=1}^m \tilde{K}_{iq}}}, i, j = 1, \ldots, m$$

with a finer scale control may be built. This finer scale control may better and more compact description of the local geometric properties of the pair-wise distances matrix $\tilde{A}$. This process is repeated until the scale factor is sufficiently fine and until $K_{ij}$ represents optimally the nature of the local geometry of $\tilde{A}$. $K_{ij}$ is normalized into a matrix $P_{ij}$, for example, by one of the following methods:

1. Graph Laplacian matrix:

$$P_{ij} = \frac{K_{ij}}{\sqrt{\sum_{q=1}^{m} K_{iq}} \sqrt{\sum_{q=1}^{m} K_{jq}}}.$$

2. Laplace-Beltrami matrix: First, the graph Laplacian matrix $$\varphi \tilde{P}_{ij} = \frac{K_{ij}}{\sqrt{\sum_{q=1}^{m} K_{iq}} \sqrt{\sum_{q=1}^{m} K_{jq}}}.$$

is computed. This process is repeated to obtain the Laplace-Beltrami matrix $$P_{ij} = \frac{\tilde{P}_{ij}}{\sqrt{\sum_{q=1}^{m} \tilde{P}_{iq}} \sqrt{\sum_{q=1}^{m} \tilde{P}_{jq}}}.$$

Since $P_{ij}$ is a symmetric positive semi-definite kernel, it enables the following eigen-decomposition:

$$P_{ij} = \sum_{w=1}^{m} \lambda_w v_w(\vec{a}_i) v_w(\vec{a}_j).$$

where $\lambda_w$ are the eigen-values and $v_w$ are the eigenvectors. Finally, the embedding matrix $\Psi$ of dimension r is computed or built by applying an out-of-sampling extension to all the MDDPs into the embedded space. The $i^{th}$ column of $\Psi$ is denoted by $\Psi^i$. One possible option is to choose $\Psi^1 = v_2$, $\Psi^2 = v_3$, $\Psi^3 = v_4$.

Referring to FIG. 3A (offline detection) and 3B (online detection), identifying abnormal MDDPs in embedding matrix $\Psi$ may be performed, for example, as outlined with respect to either step 340A (without threshold estimation) or step 340A' (with threshold estimation):

Option 1 (FIG. 5A). As shown schematically in FIG. 5A, which shows a flowchart of a method for implementing step 340A (online) or 340A' (offline), an out-of-sampling extension may be applied to all the MDDPs into the embedded space (step 506A). Specifically, given the orthonormal eigenvectors $v_w(\vec{a}_j)$ and the Nystrom extension to a new MDDP $\vec{a}_\alpha$ of $v_w(\vec{a}_\alpha)$ may be determined according to $$v_w(\vec{a}_\alpha) = \frac{1}{\lambda_w} \sum_{j=1}^{n} K_{\alpha j} v_w(\vec{a}_j).$$

Thus, any MDDP of the raw data is decomposed into a superposition of its eigenvectors using $$\psi = \sum_{w=1}^{m} (\psi \cdot v_w)_{\alpha j} v_w(\vec{a}_\alpha).$$

Once all the MDDPs are represented in the embedded space, abnormal MDDPs are identified through a MDDP density (step 508A, FIG. 5A) or through an average distances (step 506B, FIG. 5B) to nearest neighbors. For density-based anomaly detection (step 508A), the following steps may be employed: The embedding matrix $\Psi$ is used to identify the abnormal MDDPs in the data. The minimum and maximum values for every column i, i=1, . . . , r in $\Psi$ may be determined, denoting them by $\min_{\Psi^i}$ and $\max_{\Psi^i}$, respectively. Taking the row vectors from $\Psi$ the $j^{th}$ row in $\Psi$ is denoted by $\vec{\Psi}^j = \{\Psi_{ij} : l=1, \ldots, r\}$, j=1, . . . , m. For each j the number of row vectors which reside in its neighborhood, i=1, . . . , r, j=1, . . . , m, is determined, denoting $$R_{ik}^j = \left( \Psi_{ji} - \frac{\max_{\Psi^i} - \min_{\Psi^i}}{\delta} \leq \Psi_{ki} \leq \Psi_{ji} + \frac{\max_{\Psi^i} - \min_{\Psi^i}}{\delta} \right) \quad (3)$$

where $\delta$ is a pre-determined scale control of the neighborhood of each MDDP. Then, all $\vec{\Psi}^k$, k=1, . . . , m, are counted that satisfy the condition in Eq. 3.

Formally, $$\phi_j = |\{\vec{\Psi}^k : k=1, \ldots, m \text{ that satisfy } R_{1k}^j \text{ and } R_{2k}^j \text{ and } R_{3k}^j\}|.$$

Let $$\phi = \{\phi_1, \ldots, \phi_j, \ldots, \phi_m\} \text{ and}$$

$$\Phi = \{\Phi_1, \ldots, \Phi_j, \ldots, \Phi_m\} \text{ where } \Phi_j = \frac{\phi_j}{\|\phi\|_2}$$

is the normalized density vector. The maximum value in $\Phi$ is denoted by $\max_\Phi$. A histogram of $\Phi$ is constructed (step 510A) which is denoted by $\text{hist}_\Phi$. This histogram is divided into $\beta$ bins of size $$\frac{\max_\phi}{\beta}.$$

Since the majority of the MDDPs in the data are normal, all the normal MDDPs have a higher number of neighbors and their normalized density value is mapped into the upper bins in $\text{hist}_\Phi$. Conversely, since the abnormal MDDPs are a minority, these MDDPs have a smaller number of neighbors and their normalized density value is mapped into the smallest bin. Therefore, all the MDDPs in the smallest bin are classified as abnormal MDDPs (step 612A). These MDDPs are the sought after anomalies in the processed datasets. Formally, $\vec{\Psi}^j$, j=1, . . . , m, is an anomalous MDDP if $$\Phi_j \leq \frac{\max_\phi}{\beta}.$$

Otherwise, $\vec{\Psi}^j$ is a normal MDDP. The output from this process is an embedding matrix $\Psi$ and a decision mechanism that determines whether each MDDP (row vector) in this matrix is normal or abnormal.

Option 2 (FIG. 5B): Another method for identifying abnormal data MDDPs in the embedding matrix Ψ (steps 330' and 340B' in FIGS. 3A and 3B) can be based on Gaussian mixture fit and threshold estimation as shown schematically herein with respect to steps 506B-510B in FIG. 5B.

The average distance $D_{nn}$ between each MDDP in the embedded space and its nearest neighbors may be determined (step 506B, FIG. 5B), followed by performing a Gaussian mixture approximation to the distribution of $D_{nn}$ (step 508B, FIG. 5B) using, for example, the expectation-maximization function (Dempster, A., Laird, N., Rubin, D.: Maximum Likelihood from Incomplete Data via the EM Algorithm. Journal of the Royal Statistical Society 39(1) (1977) p 1-38). Namely, the Gaussian mixture can be represented by $P(D_{nn}) = \sum_{i=1}^{M} w_i G(x|\mu_i, \sigma_i)$, where $w_i$ are the Gaussian weights and $G(x|\mu_i, \sigma_i)$ are the Gaussians densities, with $\mu_i$ is the Gaussian mean of Gaussian i and $\sigma_i$ as the standard deviation of Gaussian i. The EM algorithm is an iterative algorithm that intends to maximize the likelihood of the Gaussian mixture. At each iteration the parameters $\mu_i$ and $\sigma_i$ of the Gaussian mixture may be determined until convergence is reached. The EM algorithm is applied to a variable number of Gaussians. The number of Gaussians is kept for which the Akaike information criterion (AIC) is the lowest. AIC is defined by AIC=2k−2 ln(L), where k is the number of parameters in the model, and L is the maximum likelihood derived from the EM algorithm.

In Option 2 (as opposed to Option 1), a threshold T may be set for classifying each MDDP as normal or abnormal.

The threshold T, which separates between normal MDPP and abnormal MDPP can be derived from the posterior probability for each element in $D_{nn}$, defined by $$P(i|x, \mu_i, \sigma_i) = \frac{w_i G(x|\mu_i, \sigma_i)}{\sum_{k=1}^{M} w_k G(x|\mu_k, \sigma_k)}$$

(step 510B). By means of the posterior probability, each element in $D_{nn}$ is assigned as an association probability to each of the found Gaussians. By construction, the abnormal MDDPs have an average distance $D_{nn}$ that is larger than that of the normal MDDPs. Therefore, the association probability $P(i|x, \mu_i, \sigma_i, \max_i(\mu_i+\sigma_i))$ of the largest $D_{nn}$ (of the abnormal MDDPs) relative to the Gaussian i for which $\mu_i+\sigma_i$ is the largest, is close to 1. Relative to Gaussian i, the normal MDPPs have association probability much lower than 1. The threshold $D_{nn}^t$ (also: "T") can be defined, for example, to be the distance for which $P(i|x, \mu_i, \sigma_i, \max_i(\mu_i+\sigma_i)) \approx 0.9$. Other values may also be taken in the range of, e.g., larger than 0.5, larger than 0.6, 0.7, 0.8 and smaller than 1.

The average distance between each new MDPP and its nearest neighbors in the embedded space may be determined. A new MDPP is declared as an anomalous MDDP if its $D_{nn}$ is larger than $D_{nn}^t$ (step 510B)

This ends the Offline detection described in FIG. 3A.

Online Detection is described in FIG. 3B

Two online detection functions may be applied: The first online detection method may be slower than the second one, and have an embedding matrix which may be more accurate, robust and covers better normal activities in the multidimensional data than the second online detection method, since a NAMDDP is added and is processed with all the data accumulated so far. The second online detection method may better fit online (real-time) situations, because it provides relatively faster processing for a NAMDDP.

First Online Detection Function:

The information of a NAMDDP from the multidimensional raw data is inserted into the processed matrix as done to the raw data processed by offline detection. In other words, the normalization process applied in offline detection in the training phase is applied here again to a new population which includes the NAMDDP. In essence, the offline detection process is applied to an extended matrix which contains the original multidimensional data plus the NAMDDP. This NAMDDP is normalized with the rest of the existing source data and is then embedded and detected correctly.

Second Online Detection Function:

The second online detection function may comprise two steps: offline training (steps 320 and either 330 or 330' in FIG. 3A) done once from using the training data; and online detection and classification of NAMDDPs (340A and 340B in FIG. 3A). Both steps 340A and 340B contain normalization of features extracted from the multidimensional source data. The normalization a processed matrix can involve the application of RLDM to this matrix. In order to bring all the features in the matrix to a common normalized scale. A NAMDDP produced is not normalized. Therefore, its values must be brought to the common normalized scale of the processed matrix produced in the training process. All the columns in the matrix were normalized by the application of RLDM in the training process. The geometric harmonics (GH) methodology ("A tool for multiscale out-of-sample extension of empirical functions", Applied and Computational Harmonic Analysis, 21(1), 31-52, 2006) may be exemplarily applied to each NAMDDP. However, since RLDM is applied to every column (feature) in the processed matrix, GH is applied to every value of the NAMDDP as well. Therefore, this normalization requires the application of GH according to the number of features. A major advantage of the second online detection method is that there is no need to apply the RLDM to the complete current data (training data plus NAMDDP) from the beginning as in the first online detection method. Thus, it is more efficient. Moreover, in some embodiments, alternative normalization procedures may replace the one used in the second step in the offline detection described above. After the second normalization, the embedding matrix, is extended efficiently with the new normalized MDDP via the application of GH. Finally, the NAMDDP, now normalized, is classified to be either normal or abnormal according to whether it respectively belongs or not to the training cluster generated in the training process.

Outline of the Online Detection Function:

First Training Phase (steps 320 and either 330 or 330' in FIGS. 3A and 500-504): The training step is based on the offline detection method described above. The normalization is replaced with new normalization procedures that do not require the re-application of RLDM. The remaining steps are the same as in the offline detection method. The output of the first training phase is the embedding matrix also called a "baseline profile matrix" for an online detection process. The normalization is applied to each NAMDDP. After a NAMDDP is normalized, GH is applied to extend the (reduced) embedding baseline profile matrix with the NAMDDP profile matrix is used to classify the NAMDDP as either normal or abnormal. The training contains:

a. Matrix of features called the processed matrix is produced from the selected features as was done in the offline detection method.

b. Each column (feature vector) of the processed matrix may be normalized, for example, by applying one of the following methods:
  i. Gaussian normalization, for example, as follows:
    1. Computation of the standard deviation of the column;
    2. Computation of the Gaussian kernel for each value in the column, using the pre-computed standard deviation. Each column (feature vector) in the normalized matrix is the output of the Gaussian kernel; and
    3. Saving the computed Gaussian kernel parameters to be used as a baseline for the online detection step.
  ii. Normalization of the normal probability density function, for example, as follows:
    1. Computation of the standard deviation and the mean of the column (feature vector);
    2. Computation of a normalization factor using the pre-computed standard deviation;
    3. Computation of a normal probability density function kernel for each value in the column, using the pre-computed standard deviation, mean and normalization factor. Each column vector in the normalized matrix is the output from the normal probability density function kernel; and
    4. Saving the computed normal probability density function parameters as a baseline for the online detection step.
c. The normalized matrix is processed by the application of RLDM to derive its embedding matrix (described in the training process in OF), for example, as follows:
  i. Computation of pair-wise distances in the normalized matrix;
  ii. Analysis of the distances matrix by the application of RLDM which returns a group of r, r≥2, eigenvectors. This group is the basis vectros for the embedding also called the embedding matrix; and
  iii. Saving the computed embedding matrix as a baseline for the online detection step.
d. Identification of abnormal MDDPs using the embedding, for example, as follows:
  i. Computation of the density value for each MDDP in the embedding matrix (the number of MDDPs in its neighborhood);
  ii. Generation of a histogram of the density values;
  iii. Classification of all the data MDDPs in the smallest bin as abnormal MDDPs while all the other data MDDPs are classified as normal;
  iv. Classification of all the abnormal MDDPs; and
  v. Saving the computed density and histogram parameters as a baseline for the online detection step.
2. The Option 1 for Detection (FIG. 5A): Application of automatic unsupervised tools that enable to get an online detections of anomalies. This application classifies each NAMDDP to be either normal or abnormal. The detection may include:
a. The logarithm value of a NAMDDP (row vector) is stored in the processed matrix;
b. Normalization of each value (feature) in the NAMDDP according to the saved baseline normalization method parameters, for example, as follows:
  i. Computation of a normalization kernel using the corresponding baseline normalization kernel parameters;
  ii. Each value in the normalized MDDP (row vector) is the output of the normalization kernel.
c. The normalized row vector is processed by the application of GH to derive its embedding vector as follows:
  i. Analysis of the row vector using the baseline embedding matrix (computed and saved in the training step). The analysis returns the matrix extension, which is the new embedding vector of the new processed sample.

d. Classification of the NAMDDP as normal or abnormal:
  i. Computation of the density value using the baseline embedding matrix and the baseline density parameters (computed and saved in the training step);
  ii. Placement of the density value in the baseline histogram (also computed and saved in the training step);
  iii. Classification of a MDDP mapped to the smallest bin of the baseline histogram as an abnormal MDDP. If the MDDP is not mapped to the smallest bin, it is classified as a normal MDDP.

The Option 2 for detection (FIG. 5B): Another training method for identifying abnormal data MDDPs in the embedding matrix Ψ (step 330' in FIG. 3A, respectively) through Gaussian mixture fit and threshold estimation is based on steps 506B-510B in FIG. 5B was described above.

A more detailed description of the Online detection method is outlined herein below:
1. Training:
a. Processing the raw training data: Let H be a dictionary. Let C be a matrix of size m×n that is produced from H where each vector data from H is an MDDP in C. m is the number of measurements and n is the number of features.
b. Normalization of matrix C: The matrix C can be normalized by Gaussian normalization or by normal probability density function normalization.
  i. Gaussian normalization: Let $c^l = \{c_{il}: i=1, \ldots, m\}$ be the column l, l=1, . . . , n, in C. The normalized standard deviation $$\delta^l = \varepsilon \sqrt{\frac{1}{m}\sum_{i=1}^{m}(c_{il} - \bar{c}^l)^2}, \quad \bar{c}^l = \frac{1}{m}\sum_{i=1}^{m}c_{il}$$

is computed for this column vector l. The Gaussian kernel $$K_i^l = e^{-\frac{c_{il}}{\delta^l}}, i = 1, \ldots, m,$$

is built, where $K^l$ is a column vector.

$$s^l = \sum_{i=1}^{m}K_i^l$$

is computed for this column vector. The normalized column vector $A^l$ is computed as $$A_i^l = \frac{K_i^l}{s^l}, i = 1, \ldots, m.$$

$A^l$ is normalized already since $$\sum_{i=1}^{m}A_i^l = 1.$$

The normalization parameters $\delta^l$ and $s^l$ are saved for the online detection step. This is repeated for each l, l=1, . . . , n. At the end of this process, the original data in the matrix C is replaced by the normalized matrix A.

ii. Normal probability density function normalization: Let $c^l = \{c_{il}: i=1, \ldots, m\}$ be the column l, $l=1, \ldots, n$, in C. The normalized standard deviation $$\delta^l = \varepsilon \sqrt{\frac{1}{m} \sum_{i=1}^{m} (c_{il} - \overline{c}^l)^2}, \quad \overline{c}^l = \frac{1}{m} \sum_{i=1}^{m} c_{il}$$

is computed for this column vector l. Its normalization factor is $\beta = \delta^l \sqrt{2\pi}$. The normal probability density function kernel becomes $$K_i^l = \frac{1}{\delta^l \sqrt{2\pi}} e^{\frac{-(c_{il} - \overline{c}^l)^2}{2\delta^{l2}}}, \quad i=1, \ldots, m,$$

where $K^l$ is a column vector. The normalized column vector $A^l$ becomes: $A_i^l = K_i^l \cdot \beta^l$, $i=1, \ldots, m$. The normalization parameters $\delta^l$, $\overline{c}^l$ and $\beta^l$ are saved for the online detection step. The normalization is repeated for each l, $l=1, \ldots, n$. At the end of this process, the original data in the matrix C is replaced by normalized matrix A.

c. Processing the normalized matrix A: derivation of its embedding matrix $\Psi$. The dimensionality of the data is reduced from n (number of features) to a smaller number r where usually r<<n. This process applies RLDM as described above re. OF. The output of this process is the embedding matrix $\Psi$, which is saved for the online detection step.

d. Identification of abnormal (intrusion) MDDPs in the embedding $\Psi$: The embedding matrix $\Psi$ is used to identify the abnormal MDDPs in the data.

e. Recalling that in OF that following is performed: computed the minimum and maximum values, denoted by $\min_{\Psi^i}$ and $\max_{\Psi^i}$, respectively, for every column i, $i=1, \ldots r$, in $\Psi$; built the normalized density vector $\Phi$ using the norm of the density values $\|\phi\|_2$ and constructed the histogram that is divided into $\beta$ bins of size $$\gamma = \frac{\max_\Phi}{\beta}.$$

In some embodiments, all are saved for the online detection step.

The outputs from the training step are the normalization parameters ($\delta^l$— the normalized standard deviation and $s^l$, $l=1, \ldots, n$—the sum of the Gaussian kernel), the 3D embedding matrix ($\Psi$) and the parameters ($\min_{\Psi^i}$ and $\max_{\Psi^i}$, $i=1, \ldots r$, $\|\phi\|_2$ and $\gamma$) for the decision mechanism that determine whether each MDDP in this matrix is normal or abnormal. These outputs are the baseline parameters for the online detection step next.

2. Detection:

a. Online processing of a new sample: Let P be a row vector of size 1×n produced online where n is the number of gathered features.

b. Online normalization of sample P: Baseline normalization parameters $\delta^l$ and $s^l$ are used which were saved in the training step. Two methods are exemplified herein:

i. Gaussian normalization: Denote $P = \{p^1, \ldots, p^n\}$. The Gaussian kernel $$K^l = e^{-\frac{p^l}{\delta^l}}$$

is computed using $\delta^l$ and $s^l$, $l=1, \ldots, n$. The normalized value $A^l$ is constructed as follows:

$$A^l = \frac{K^l}{s^l}.$$

The kernel computation and normalization is repeated for each l, $l=1, \ldots, n$. At the end of this process, the original row vector P is replaced by the normalized row vector $A = \{A^1, \ldots, A^n\}$.

ii. Normal probability density function normalization: Using, e.g., baseline parameters $\delta^l$, $\overline{c}^l$ (the mean) and $\beta^l$ (the normalization factor), $l=1, \ldots, n$. Denote $P = \{p^1, \ldots, p^n\}$. The normal probability density function kernel $$K^l = \frac{1}{\delta^l \sqrt{2\pi}} e^{\frac{-(p^l - \overline{c}^l)^2}{2\delta^{l2}}}$$

and the normalized value $A^l$ are computed as follows: $A^l = K^l \cdot \beta^l$. The kernel computation and normalization is repeated for each l, $l=1, \ldots, n$. At the end of this process, the original row vector P is replaced by the normalized row vector $A = \{A^1, \ldots, A^n\}$.

c. Processing of normalized matrix A—derivation of embedding matrix $\Psi$: Starting with the baseline embedding matrix $\Psi$, saved in the training step. The dimensionality of A is reduced from n to a smaller dimension r where usually r<<n. This process uses the application of GH to extend the baseline embedding matrix $\Psi$ with the normalized vector A and obtain an extension of the matrix. This extension is the new embedding vector $\psi$ of the new sample.

d. Online classification of a NAMDDP as normal or abnormal using the embedding matrix $\psi$: Baseline embedding matrix $\Psi$ and the baseline identification parameters $\min_{\Psi^i}$ and $\max_{\Psi^i}$, $i=1, \ldots, r$ $\|\phi\|_2$ (the norm of the density values) and $\gamma$ (the size of the bins in the histogram), saved in the training step, are used to classify the NAMDDP $\psi$ as normal or abnormal using the new embedding vector $\psi$. EQ. 1 is used to compute for $\psi$ the number of row vectors in $\Psi$ that reside in its neighborhood. Then, all the vectors which satisfy the condition in Eq. 1, are counted and denoted by $\phi_\psi$. The normalized density value is computed by $$\Phi_\psi = \frac{\phi_\psi}{\|\phi\|_2}.$$

In the OFID function, it was shown that the normalized density value of an abnormal MDDP is mapped into the smallest bin. Therefore, all the MDDPs in the smallest bin are classified as abnormal MDDPs. These are the sought after intrusions MDDPs. Therefore, the new sample is classified as abnormal if it is mapped into the smallest bin. Formally, $\psi$ is an intrusion if $\Phi_\psi \leq \gamma$. Otherwise, $\psi$ is a normal MDDP.

In summary, the output of the detection step is at least a 2D embedding vector ψ and a decision mechanism that determines whether each NAMDDP is normal or abnormal.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

For example, any digital computer system can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to an embodiment of the method disclosed herein. The techniques necessary to achieve this are well known to those skilled in the art and thus are not further described herein. The methods and/or processes disclosed herein may be implemented as a computer program product such as, for example, a computer program tangibly embodied in an information carrier, for example, in a non-transitory computer-readable or non-transitory machine-readable storage device and/or in a propagated signal, for execution by or to control the operation of, a data processing apparatus including, for example, one or more programmable processors and/or one or more computers. The terms "non-transitory computer-readable storage device" and "non-transitory machine-readable storage device". The term "non-transitory" is used to exclude transitory, propagating signals, but to otherwise include any volatile or non-volatile computer memory technology suitable to the application including, for example, distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by a communication network.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It is appreciated that certain features of the invention, which are, for clarity, described in the context of separate embodiments or example, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. In a computer system, a method comprising:
   a) receiving data comprising a plurality of measurements m of multidimensional data points (MDDPs), each data point having n features wherein n≥3, wherein m>>n and wherein the data forms a matrix A with size m×n and rank k;
   b) applying randomized lower and upper triangular matrix (LU) decomposition to matrix A to obtain a dictionary D in the form of a matrix l×n, wherein k<l, wherein k<<m and wherein accordingly dictionary D has fewer measurements than matrix A;
   c) applying a kernel method to dictionary D to obtain an embedded dictionary D with a dimension lower than n by normalizing dictionary D to obtain a normalized Markov matrix with a respective dimension and reducing the respective dimension of the normalized Markov matrix to obtain embedded dictionary D; and
   d) based on embedded dictionary D, classifying a MDDP or a newly arrived MDDP (NAMDDP) as an anomaly using a Gaussian mixture fit,
   whereby the reduction in the number of measurements from m to l and further reducing the dimension n to a dimension lower than n reduces computer processing requirements, thereby enhancing anomaly detection performance.

2. The method of claim 1, further comprising:
   e) repeating (b) p≥1 times to obtain p additional dictionaries D(p);
   f) concatenating each additional dictionary D(p) with all previously obtained dictionaries into a concatenated dictionary Dc; and
   g) applying the kernel method to concatenated dictionary D to obtain an embedded concatenated dictionary D with a dimension lower than n,
   whereby the repeating (b) p≥1 times provides a more robust embedded concatenated dictionary Dc and improves anomaly detection performance.

3. The method of claim 1, wherein the classifying a MDDP or a newly arrived MDDP (NAMDDP) as an anomaly includes classifying without relying on a signature and/or a rule and/or on domain expertise.

4. A computer program product, comprising: a non-transitory tangible storage medium readable by a processing circuit and storing instructions for execution by the processing circuit for performing a method comprising:
   a) receiving data comprising a plurality of measurements m of multidimensional data points (MDDPs), each data point having n features wherein n≥3, wherein m>>n and wherein the data forms a matrix A with size m×n and rank k;
   b) applying randomized lower and upper triangular matrix (LU) decomposition to matrix A to obtain a dictionary D in the form of a matrix l×n, wherein k<l, wherein k<<m and wherein accordingly dictionary D has fewer measurements than matrix A;
   c) applying a kernel method to dictionary D to obtain an embedded dictionary D with a dimension lower than n by normalizing dictionary D to obtain a normalized Markov matrix with a respective dimension and reducing the respective dimension of the normalized Markov matrix to obtain embedded dictionary D; and
   d) based on embedded dictionary D, classifying a MDDP or a newly arrived MDDP(NAMDDP) as an anomaly using a Gaussian mixture fit,
      whereby the reduction in the number of measurements from m to l and further reducing the dimension n to a dimension lower than n reduces computer processing requirements, thereby enhancing anomaly detection performance.

5. The computer program product of claim 4, wherein the method further comprises:
   e) repeating (b) p≥1 times to obtain p additional dictionaries D(p);
   f) concatenating each additional dictionary D(p) with all previously obtained dictionaries into a concatenated dictionary Dc; and
   g) applying the kernel method to concatenated dictionary D to obtain an embedded concatenated dictionary D with a dimension lower than n,
      whereby the repeating (b) p≥1 times provides a more robust embedded concatenated dictionary Dc and improves anomaly detection performance.

6. The computer program product of claim 4, wherein the classifying a MDDP or a newly arrived MDDP(NAMDDP) as an anomaly includes classifying without relying on a signature and/or a rule and/or on domain expertise.

7. A computer system, comprising a hardware processor configurable to perform a method comprising steps of:
   a) receiving data comprising a plurality of measurements m of multidimensional data points (MDDPs), each data point having n features wherein n≥3, wherein m>>n and wherein the data forms a matrix A with size m×n and rank k;
   b) applying randomized lower and upper triangular matrix (LU) decomposition to matrix A to obtain a dictionary D in the form of a matrix l×n, wherein k<l, wherein k<<m and wherein accordingly dictionary D has fewer measurements than matrix A;
   c) applying a kernel method to dictionary D to obtain an embedded dictionary D with a dimension lower than n by normalizing dictionary D to obtain a normalized Markov matrix with a respective dimension and reducing the respective dimension of the normalized Markov matrix to obtain embedded dictionary D; and
   d) based on embedded dictionary D, classifying a MDDP or a newly arrived MDDP(NAMDDP) as an anomaly using a Gaussian mixture fit,
      whereby the reduction in the number of measurements from m to l and further reducing the dimension n to a dimension lower than n reduces computer processing requirements, thereby enhancing anomaly detection performance.

8. The computer system of claim 7, wherein the method further comprises:
   e) repeating (b) p≥1 times to obtain p additional dictionaries D(p);
   f) concatenating each additional dictionary D(p) with all previously obtained dictionaries into a concatenated dictionary Dc; and
   g) applying the kernel method to concatenated dictionary D to obtain an embedded concatenated dictionary D with a dimension lower than n,
      whereby the repeating (b) p≥1 times removes randomization effects related to the randomized LU decomposition by causing eigenvalues of each dictionary D to decline, thereby providing a more robust embedded concatenated dictionary Dc and improving anomaly detection performance.

9. The computer system of claim 8, wherein the classifying a MDDP or a newly arrived MDDP(NAMDDP) as an anomaly includes classifying without relying on a signature and/or a rule and/or on domain expertise.

10. The computer system of claim 7, wherein the classifying a MDDP or a newly arrived MDDP(NAMDDP) as an anomaly includes classifying without relying on a signature and/or a rule and/or on domain expertise.

\* \* \* \* \*